US011904616B2

(12) United States Patent
Watanabe

(10) Patent No.: US 11,904,616 B2
(45) Date of Patent: Feb. 20, 2024

(54) INFORMATION PROCESSING APPARATUS, TAPE PRINTING APPARATUS, AND METHOD AND PROGRAM FOR CONTROLLING INFORMATION PROCESSING APPARATUS

(71) Applicant: SEIKO EPSON CORPORATION, Tokyo (JP)

(72) Inventor: Hidetaka Watanabe, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 205 days.

(21) Appl. No.: 17/689,456

(22) Filed: Mar. 8, 2022

(65) Prior Publication Data

US 2022/0288948 A1 Sep. 15, 2022

(30) Foreign Application Priority Data

Mar. 9, 2021 (JP) ................................ 2021-037877

(51) Int. Cl.
*B41J 2/325* (2006.01)
*B41J 3/407* (2006.01)

(52) U.S. Cl.
CPC ............ *B41J 2/325* (2013.01); *B41J 3/4075* (2013.01)

(58) Field of Classification Search
CPC ........ B41J 3/4075; B41J 2/325; B41J 11/008; B41J 32/00
See application file for complete search history.

(56) References Cited

U.S. PATENT DOCUMENTS

| | | | | |
|---|---|---|---|---|
| 5,885,016 | A * | 3/1999 | Toyosawa | B41J 3/4075 400/621 |
| 6,012,860 | A * | 1/2000 | Nunokawa | B41J 3/4075 400/208 |
| 2016/0271980 | A1 | 9/2016 | Sasaki | |
| 2017/0136789 | A1 | 5/2017 | Sasaki | |
| 2018/0365539 | A1* | 12/2018 | Ogawa | G06K 15/02 |
| 2020/0269611 | A1* | 8/2020 | Murayama | B41J 11/70 |

FOREIGN PATENT DOCUMENTS

| | | | |
|---|---|---|---|
| JP | H11-105353 | A | 4/1999 |
| JP | 2014-133376 | A | 7/2014 |
| JP | 2014-188783 | A | 10/2014 |
| JP | 2015-074096 | A | 4/2015 |

* cited by examiner

*Primary Examiner* — Kristal Feggins
(74) *Attorney, Agent, or Firm* — Oliff PLC

(57) ABSTRACT

An information processing apparatus communicatively connected to a tape printing apparatus includes a tape width acquirer that acquires a tape width; a receiver that receives an instruction to print a print image; a calculator that calculates a margin length of a margin region of the tape measured in a tape width direction, the print region being where the print image is to be printed; a proportion determiner that determines whether or not the margin length is a particular proportion or above of the tape width; and a print controller that controls the tape printing apparatus to print a margin image when it is determined that the margin length is the particular proportion or above of the tape width, and controls the tape printing apparatus not to print the margin image when it is determined that the margin length is not the particular proportion or above of the tape width.

9 Claims, 11 Drawing Sheets

INFORMATION PROCESSING APPARATUS, TAPE PRINTING APPARATUS, AND METHOD AND PROGRAM FOR CONTROLLING INFORMATION PROCESSING APPARATUS

The present application is based on, and claims priority from JP Application Serial Number 2021-037877, filed Mar. 9, 2021, the disclosure of which is hereby incorporated by reference herein in its entirety.

BACKGROUND

1. Technical Field

The present disclosure relates to an information processing apparatus, a tape printing apparatus, and a method and program for controlling the information processing apparatus.

2. Related Art

As disclosed in JP-A-2015-074096, there has been known an information processing apparatus communicatively connected to a tape printing apparatus to control printing by the tape print apparatus that prints a print image by thermal transfer of an ink on an ink ribbon to a tape.

To print an image on a tape, the tape printing apparatus disclosed in JP-A-2015-074096 thermally transfers an ink on an ink ribbon to the tape by transporting the tape and the ink ribbon while holding them between a printhead and a platen roller. However, if the tape has a large area in the tape width direction where no print image is printed, the tape accordingly has a large area to which no ink on an ink ribbon is transferred, which may consequently cause creasing of the ink ribbon when the tape and the ink ribbon pass between the printhead and the platen roller and therefore cause print failures.

SUMMARY

An information processing apparatus is an information processing apparatus communicatively connected to a tape printing apparatus that performs printing by thermal transfer of an ink on an ink ribbon to a tape, the information processing apparatus including: a tape width acquirer that acquires a tape width of the tape; a receiver that receives an instruction to print a print image; a calculator that calculates a margin length of a margin region of the tape measured in a tape width direction, the margin region being provided with respect to a print region in the tape width direction, the print region being where the print image is to be printed; a proportion determiner that determines whether or not the margin length is a particular proportion or above of the tape width; and a print controller that controls the tape printing apparatus to print the print image in the print region and to print a margin image in the margin region when it is determined that the margin length is the particular proportion or above of the tape width, and controls the tape printing apparatus to print the print image in the print region and not to print the margin image in the margin region when it is determined that the margin length is not the particular proportion or above of the tape width.

An information processing apparatus is an information processing apparatus communicatively connected to a tape printing apparatus that performs printing by thermal transfer of an ink on an ink ribbon to a tape, the information processing apparatus including: a tape type acquirer that acquires a tape type of the tape; a receiver that receives an instruction to print a print image; a tape determiner that determines whether the tape is of a particular type based on the tape type acquired; and a print controller that controls the tape printing apparatus to print the print image in a print region of the tape and to print a margin image in a margin region of the tape provided with respect to the print region in the tape width direction when it is determined that the tape is of the particular type, and controls the tape printing apparatus to print the print image in the print region and not to print the margin image in the margin region when it is determined that the tape is not of the particular type.

A tape printing apparatus is includes: a print unit that performs printing by thermal transfer of an ink on an ink ribbon to a tape; a tape width acquirer that acquires a tape width of the tape; a receiver that receives an instruction to print a print image; a calculator that calculates a margin length of a margin region of the tape measured in a tape width direction, the margin region being provided with respect to a print region in the tape width direction, the print region being where the print image is to be printed; a proportion determiner that determines whether or not the margin length is a particular proportion or above of the tape width; and a print controller that controls the print unit to print the print image in the print region and to print a margin image in the margin region when it is determined that the margin length is the particular proportion or above of the tape width, and controls the print unit to print the print image in the print region and not to print the margin image in the margin region when it is determined that the margin length is not the particular proportion or above of the tape width.

A method for controlling an information processing apparatus is a method for controlling an information processing apparatus communicatively connected to a tape printing apparatus that performs printing by thermal transfer of an ink on an ink ribbon to a tape, the method including causing the information processing apparatus to execute acquiring a tape width of the tape, receiving an instruction to print a print image, calculating a margin length of a margin region of the tape measured in a tape width direction, the margin region being provided with respect to a print region in the tape width direction, the print region being where the print image is to be printed, determining whether or not the margin length is a particular proportion or above of the tape width, controlling the tape printing apparatus to print the print image in the print region and to print a margin image in the margin region when it is determined that the margin length is the particular proportion or above of the tape width, and controlling the tape printing apparatus to print the print image in the print region and not to print the margin image in the margin region when it is determined that the margin length is not the particular proportion or above of the tape width.

A non-transitory computer-readable storage medium storing a program is a program including: causing an information processing apparatus communicatively connected to a tape printing apparatus that performs printing by thermal transfer of an ink on an ink ribbon to a tape to execute acquiring a tape width of the tape, receiving an instruction to print a print image, calculating a margin length of a margin region of the tape measured in a tape width direction, the margin region being provided with respect to a print region in the tape width direction, the print region being where the print image is to be printed, determining whether or not the margin length is a particular proportion or above of the tape width, controlling the tape printing apparatus to print the print image in the print region and to print a margin image in the margin region when it is determined that the margin length is the particular proportion or above of the tape width, and controlling the tape printing apparatus to print the print image in the print region and not to print the margin image in the margin region when it is determined that the margin length is not the particular proportion or above of the tape width.

DESCRIPTION OF EXEMPLARY EMBODIMENTS

First Embodiment

With reference to the accompanying drawings, a description is given below of an information processing apparatus, a tape printing apparatus, and a method and program for controlling the information processing apparatus. Note that some drawings show XYZ Cartesian coordinate system, but this is only for the convenience of illustration and by no means limits the following embodiment.

Figure 1:
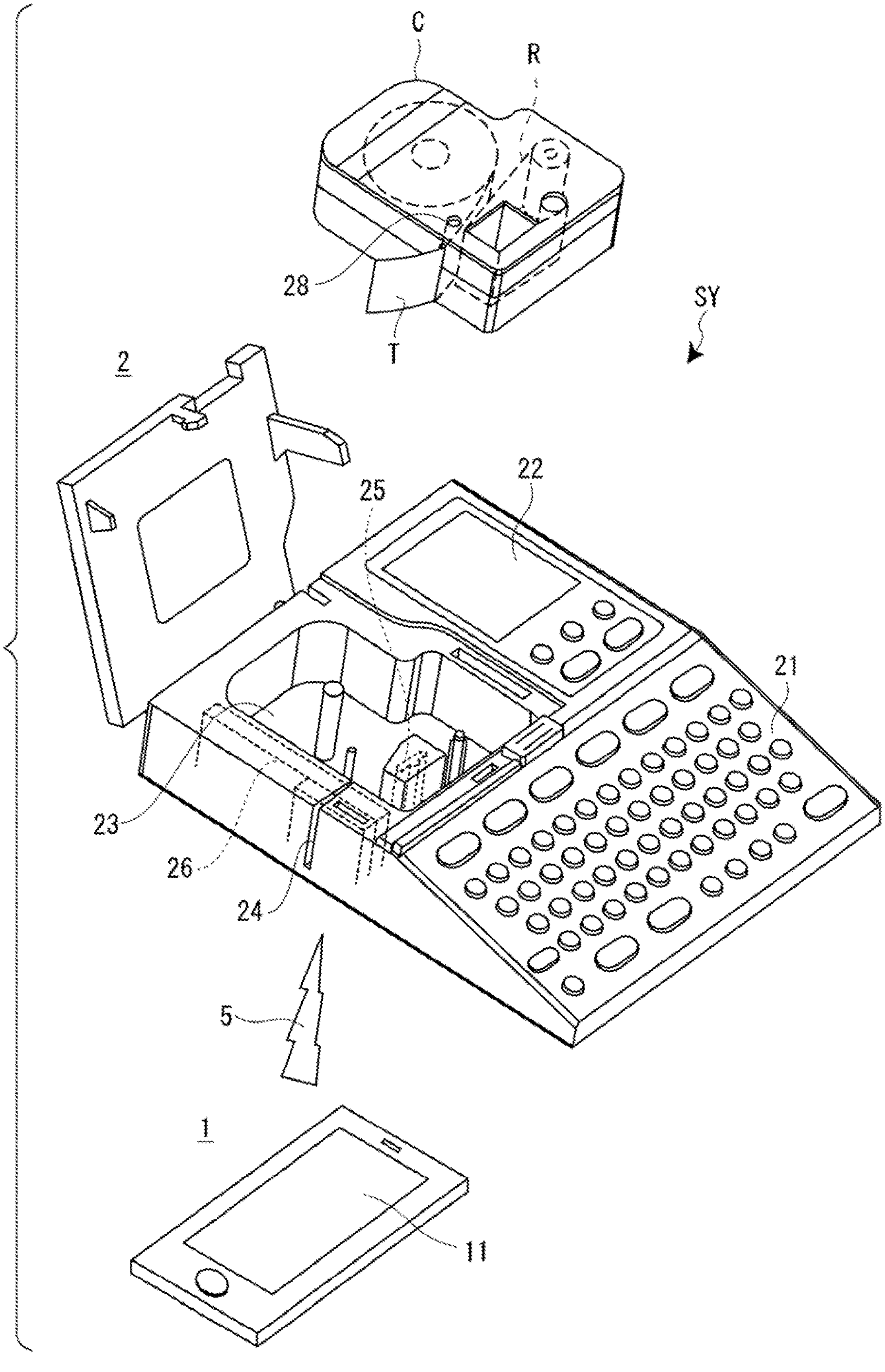
FIG. 1 is an external view of a mobile terminal and a tape printing apparatus included in a tape printing system.

FIG. 1 is an external view of a mobile terminal 1 and a tape printing apparatus 2 that are included in a tape printing system SY. The mobile terminal 1 is an example of the "information processing apparatus." The tape printing system SY includes the mobile terminal 1 and the tape printing apparatus 2, which are connected via wireless communications 5. Note that, instead of being connected via the wireless communications 5, the mobile terminal 1 and the tape printing apparatus 2 may be connected in a wired manner via a cable or the like.

The mobile terminal 1 includes a touch panel 11. The touch panel 11 is an example of the "display unit." The mobile terminal 1 has installed therein a label creation application 30 (see FIG. 2) for creating a label LA in cooperation with the tape printing apparatus 2. The label creation application 30 is an example of the "program." The mobile terminal 1 uses the label creation application 30 to generate print data used for creating the label LA and transmits the generated print data to the tape printing apparatus 2. Note that as the mobile terminal 1, a smartphone is shown in FIG. 1, but a tablet terminal, a laptop personal computer (PC), or the like may be used instead.

The tape printing apparatus 2 includes a keyboard 21, a display 22, a cartridge attachment section 23, and a tape discharge opening 24.

Figure 5:
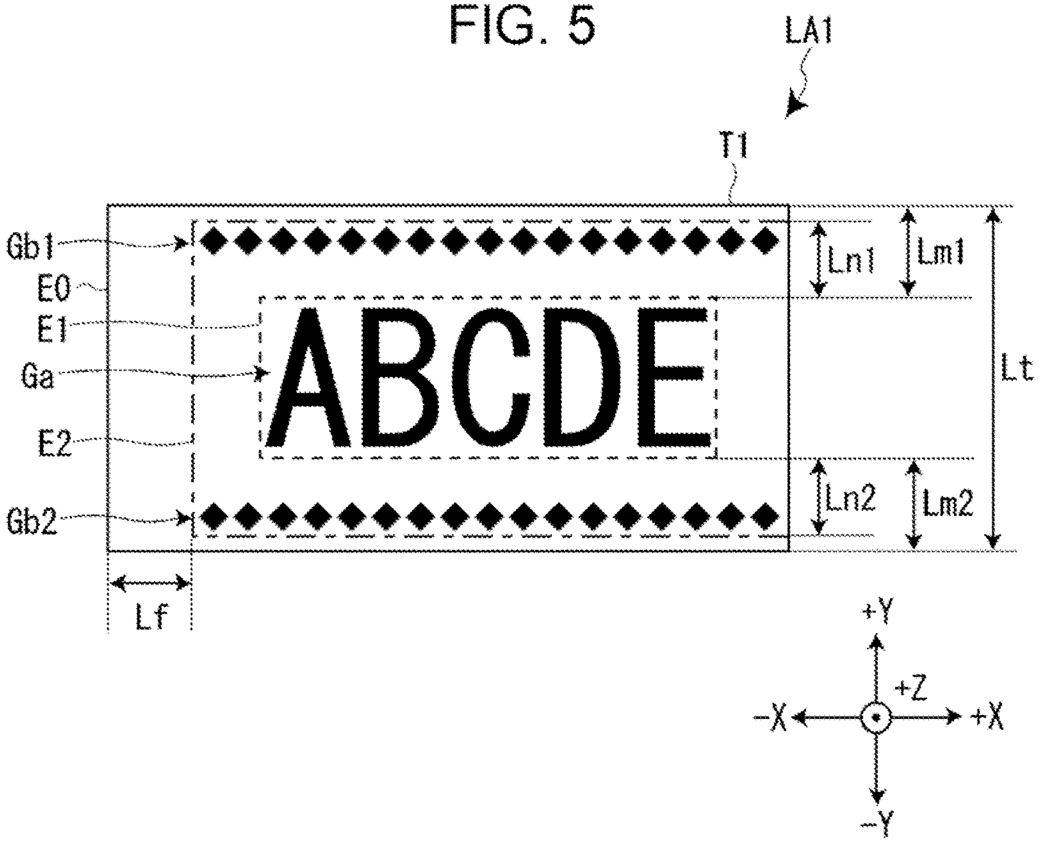
FIG. 5 is a diagram showing an example of how the regular label is printed.

The keyboard 21 receives various operations such as editing a print image Ga (see, e.g., FIG. 5). The display 22 displays various pieces of information such as an edit screen used for editing the print image Ga. A tape cartridge C is detachably attached to the cartridge attachment section 23. The tape cartridge C houses, inside its casing, a tape T and an ink ribbon R. The tape cartridge C is also provided with a platen roller 28.

The cartridge attachment section 23 is provided with a printhead 25. With the tape cartridge C attached to the cartridge attachment section 23, the printhead 25 is driven and produces heat in accordance with results on the editing of the print image Ga. As a result, an ink on the ink ribbon R is thermally transferred to the tape T, printing the print image Ga.

The printed tape T is discharged from the tape discharge opening 24. A cutter 26 is provided between the cartridge attachment section 23 and the tape discharge opening 24. The cutter 26 cuts the tape T in the tape width direction. As printed portion of the tape T is thus cut off. The printed portion of the tape T thus cut off is used as a label LA.

Note that the tape printing apparatus 2 is capable of not only the printing based on results of edits made to the print image Ga using the keyboard 21, but also printing based on print data transmitted from the mobile terminal 1. A case described in the first embodiment is the latter, i.e., the tape printing apparatus 2 performs printing based on print data transmitted from the mobile terminal 1.

Figure 2:
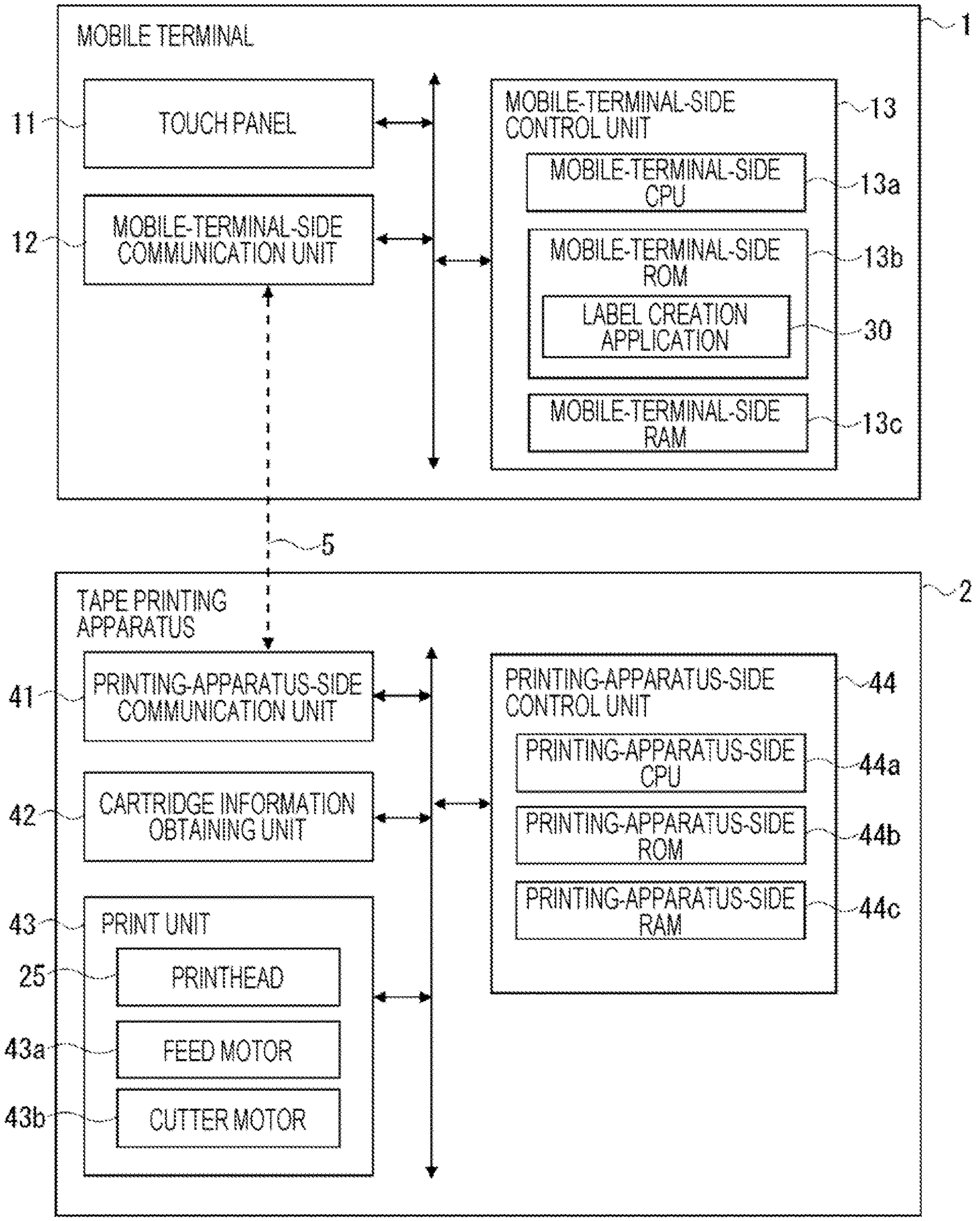
FIG. 2 is a block diagram showing the hardware configurations of the mobile terminal and the tape printing apparatus.

FIG. 2 is a block diagram showing the hardware configurations of the mobile terminal 1 and the tape printing apparatus 2. The mobile terminal 1 includes the touch panel 11, a mobile-terminal-side communication unit 12, and a mobile-terminal-side control unit 13.

The touch panel 11 receives various user operations and displays various pieces of information. For example, the touch panel 11 displays a first selection screen D1 (see FIG. 9) to be described later.

The mobile-terminal-side communication unit 12 communicates with the tape printing apparatus 2 via the wireless communications 5. For example, the mobile-terminal-side communication unit 12 transmits print data to the tape printing apparatus 2 and receives cartridge information from the tape printing apparatus 2, the cartridge information indicating the type of the tape cartridge C attached to the tape printing apparatus 2.

The mobile-terminal-side control unit 13 includes a mobile-terminal-side central processing unit (CPU) 13*a*, a mobile-terminal-side read-only memory (ROM) 13*b*, and a mobile-terminal-side random-access memory (RAM) 13*c*.

The mobile-terminal-side CPU 13*a* performs various kinds of control by loading various control programs stored in the mobile-terminal-side ROM 13*b* into the mobile-terminal-side RAM 13*c* and executing them. Note that the mobile-terminal-side control unit 13 may employ a hardware circuit such as an application-specific integrated circuit (ASIC) as a processor instead of the mobile-terminal-side CPU 13*a*. Also, the processor may be configured to operate with one or more CPUs and hardware circuits such as an ASIC cooperating with each other.

The mobile-terminal-side ROM 13*b* is a rewritable ROM and stores therein various control programs and various sets of control data. For example, the mobile-terminal-side ROM 13*b* stores therein the label creation application 30. The label creation application 30 is an application program for creating various kinds of labels LA such as a regular label LA1 shown in, e.g., FIG. 5. The regular label LA1 is a label LA created using a regular tape T1 shown in FIG. 3.

Figure 3:
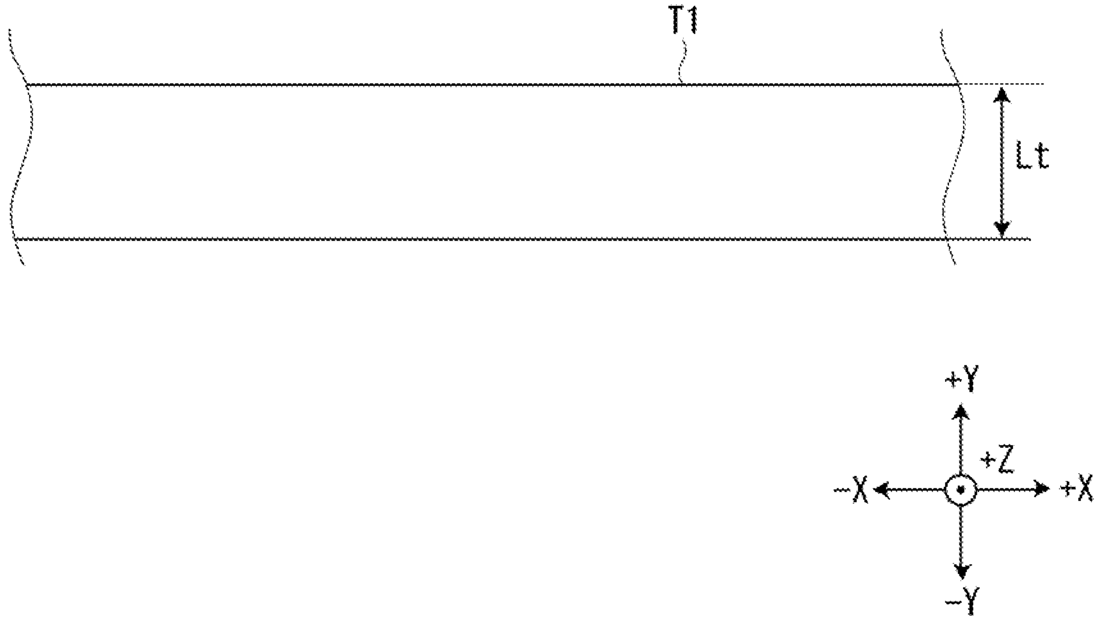
FIG. 3 is a diagram showing a regular tape in the +Z-direction.

Now, the regular tape T1 is described with reference to FIG. 3. In FIG. 3, the X-axis represents a tape length direction, the Y-axis represents a tape width direction, and the Z-axis represents a tape thickness direction. The same applies to the other drawings including the XYZ Cartesian coordinate system. The regular tape T1 is resinous and has a structure such that release paper is provided on the −Z-direction side of a print layer. FIG. 3 shows the print surface of the print layer of the regular tape T1. During printing, the regular tape T1 is transported in the −X direction along a tape transport path (not shown).

Referring back to FIG. 2, the tape printing apparatus 2 includes a printing-apparatus-side communication unit 41, a cartridge information obtaining unit 42, a print unit 43, and a printing-apparatus-side control unit 44.

The printing-apparatus-side communication unit 41 communicates with the mobile terminal 1 via the wireless communications 5.

The cartridge information obtaining unit 42 includes an optical scanner (not shown) that optically scans a code image printed on or attached as a label to the casing of the tape cartridge C. By decoding the image scanned by the optical scanner, the cartridge information obtaining unit 42 obtains cartridge information indicating the type of the tape cartridge C. The cartridge information includes information indicating the tape width Lt of the tape T housed in the tape cartridge C.

The print unit 43 is a mechanism for printing an image on the tape T, and includes the printhead 25, a feed motor 43*a*, and a cutter motor 43*b*. The printhead 25 includes a plurality of heat producing elements and thermally transfers an ink from the ink ribbon R to the tape T. The feed motor 43*a* is a drive source for feeding the tape T and the ink ribbon R. The cutter motor 43*b* is a drive source for driving the cutter 26.

The printing-apparatus-side control unit 44 includes a printing-apparatus-side CPU 44*a*, a printing-apparatus-side ROM 44*b*, and a printing-apparatus-side RAM 44*c*.

The printing-apparatus-side CPU 44*a* performs various kinds of control by loading the control programs stored in the printing-apparatus-side ROM 44*b* into the printing-apparatus-side RAM 44*c* and executing them. Note that the printing-apparatus-side control unit 44 may employ a hardware circuit such as an ASIC as a processor instead of the printing-apparatus-side CPU 44*a*. Also, the processor may be configured to operate with one or more CPUs and hardware circuits such as an ASIC cooperating with each other.

The printing-apparatus-side ROM 44*b* stores therein various control programs such as firmware. The printing-apparatus-side CPU 44*a* uses the control programs stored in the printing-apparatus-side ROM 44*b* to print an image on the tape T based on the print data transmitted from the mobile terminal 1. Also, when a cartridge information request signal is received from the mobile terminal 1 or when the tape cartridge C is replaced, the printing-apparatus-side CPU 44*a* obtains, via the cartridge information obtaining unit 42, cartridge information from a code image on the tape cartridge C and transmits the obtained cartridge information to the mobile terminal 1.

As described earlier, the tape printing apparatus 2 prints a print image Ga on a tape T by transporting the tape T and an ink ribbon R housed in the tape cartridge C while holding the tape T and the ink ribbon R between the printhead 25 and the platen roller 28 shown in FIG. 1. In such thermal transfer printing, if the tape T has a large area in the Y-axis of the tape T where no print image Ga is printed, the tape T accordingly has a large area to which no ink on the ink ribbon R is thermally transferred. As a result, the ink ribbon R exhibits weak adhesion to the tape T and is therefore difficult to follow the tape T, consequently getting creased and causing printing failures. To overcome such printing failures, when an instruction is issued to print a print image Ga having a large unprinted area in the Y-axis of the tape T, the mobile terminal 1 according to the first embodiment causes the tape printing apparatus 2 to print not only the print image Ga, but also a margin image Gb shown in, e.g., FIG. 5, in at least one of the +Y-direction and the −Y direction of the print image Ga. Details will be described below with respect to printing the margin image Gb.

Figure 4:
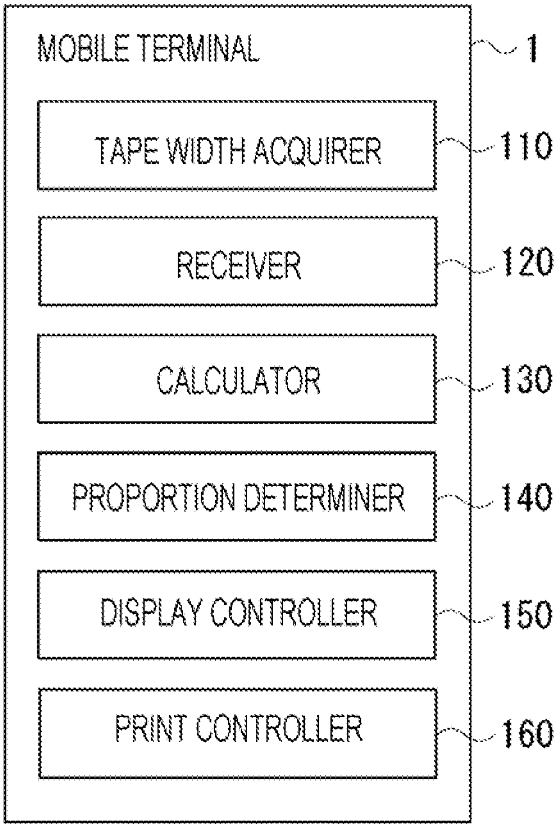
FIG. 4 is a block diagram showing the functional configuration of the mobile terminal.

FIG. 4 is a block diagram showing the functional configuration of the mobile terminal 1. The mobile terminal 1 includes, as its functional configuration, a tape width acquirer 110, a receiver 120, a calculator 130, a proportion determiner 140, a display controller 150, and a print controller 160. These functions are all functions implemented when the mobile-terminal-side CPU 13*a* executes the label creation application 30.

The tape width acquirer 110 acquires the tape width Lt of the tape T. The tape width acquirer 110 acquires the tape width Lt from the cartridge information transmitted from the tape printing apparatus 2. In the first embodiment, when a user edits a print image Ga and instructs to print the print image Ga, the tape width acquirer 110 transmits a cartridge information request signal to the tape printing apparatus 2 and receives cartridge information from the tape printing apparatus 2, thereby acquiring the tape width Lt.

The receiver 120 receives an instruction to print the print image Ga from a user. The receiver 120 receives the instruction to print the print image Ga when a print button for instructing printing is selected on an edit screen (not shown).

Figure 6:
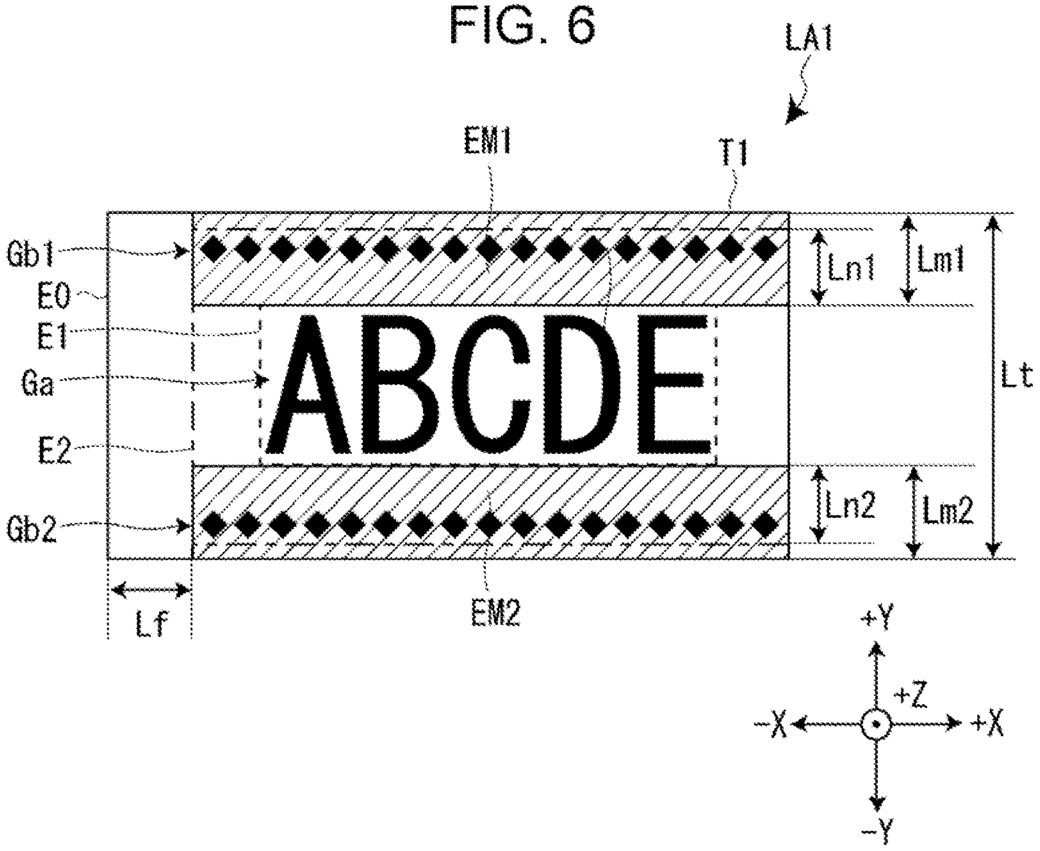
FIG. 6 is a diagram illustrating margin regions on the regular label.

For the tape T as shown in FIG. 6, the calculator 130 calculates the tape margin length Lm of a margin region EM measured in the Y-axis, the margin region EM being provided with respect to a print region E1 in the Y-axis, the print region E1 being where the print image Ga is to be printed. The tape margin length Lm is an example of the "margin length." The tape T is provided with, as the margin region EM, a first margin region EM1 and a second margin region EM2, the first margin region EM1 being located on one side of the print region E1 in the Y axis and the second margin region EM2 being located on the other side of the print region E1 in the Y-axis. In the first embodiment, the margin region EM located on the +Y-direction side of the print region E1 is the first margin region EM1, and the margin region EM located on the −Y-direction side of the print region E1 is the second margin region EM2. Based on the tape width Lt acquired by the tape width acquirer 110 and the print image Ga for which the receiver 120 has received a print instruction, the calculator 130 calculates, as the tape margin length Lm, a first tape margin length Lm1 of the first margin region EM1 measured in the Y-axis and a second tape margin length Lm2 of the second margin region EM2 measured in the Y-axis. Note that the position of the print image Ga on the tape T is determined by print image data to be described later.

Based on the tape width Lt acquired by the tape width acquirer 110 and the tape margin length Lm calculated by the calculator 130, the proportion determiner 140 determines whether or not the tape margin length Lm is a first particular proportion or above of the tape width Lt. More specifically, the proportion determiner 140 determines whether or not the first tape margin length Lm1 is the first particular proportion or above of the tape width Lt and determines whether or not the second tape margin length Lm2 is the first particular proportion or above of the tape width Lt. An example of the first particular proportion is 20%.

Figure 9:
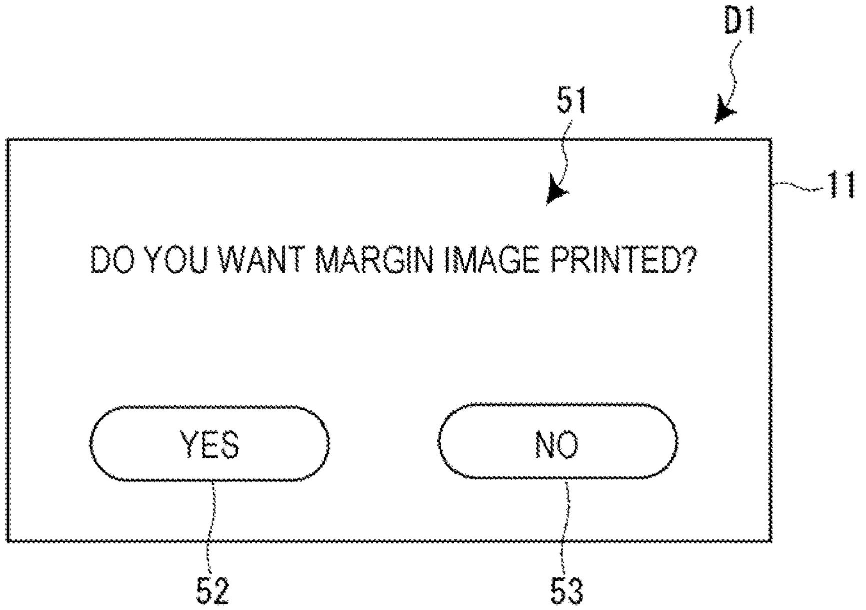
FIG. 9 is a diagram showing an example of what a selection screen presents.

When the proportion determiner 140 determines that the first tape margin length Lm1 is the first particular proportion or above of the tape width Lt or when the proportion determiner 140 determines that the second tape margin length Lm2 is the first particular proportion or above of the tape width Lt, the display controller 150 displays the first selection screen D1 shown in FIG. 9 on the touch panel 11 to have the user select whether to print the margin image Gb. The display controller 150 also displays the first selection screen D1 on the touch panel 11 when the proportion determiner 140 determines that the first tape margin length Lm1 and the second tape margin length Lm2 are both the first particular proportion or above of the tape width Lt.

When it is selected on the first selection screen D1 to print the margin image Gb, the print controller 160 controls the tape printing apparatus 2 to print the print image Ga in the print region E1 and to print the margin image Gb in the margin region EM. When it is selected on the first selection screen D1 not to print the margin image Gb, the print controller 160 controls tape printing apparatus 2 to print the print image Ga in the print region E1 and not to print the margin image Gb in the margin region EM.

More specifically, when the proportion determiner 140 determines that the first tape margin length Lm1 is the first particular proportion or above of the tape width Lt and then when it is selected on the first selection screen D1 to print the margin image Gb, the print controller 160 controls the tape printing apparatus 2 to print the print image Ga in the print region E1 and to print the margin image Gb in the first margin region EM1. Also, when the proportion determiner 140 determines that the second tape margin length Lm2 is the first particular proportion or above of the tape width Lt and then when it is selected on the first selection screen D1 to print the margin image Gb, the print controller 160 controls the tape printing apparatus 2 to print the print image Ga in the print region E1 and to print the margin image Gb in the second margin region EM2.

Meanwhile, when the proportion determiner 140 determines that at least one of the first tape margin length Lm1 and the second tape margin length Lm2 is the first particular proportion or above of the tape width Lt and then when it is selected on the first selection screen D1 not to print the margin image Gb, the print controller 160 controls the tape printing apparatus 2 to print the print image Ga in the print region E1 and not to print the margin image Gb in the first margin region EM1 and the second margin region EM2.

To have the tape printing apparatus 2 print the print image Ga and the margin image Gb, the print controller 160 transmits print data to the tape printing apparatus 2, the print data including print image data for printing the print image Ga and the margin image Gb and a print instruction command. To have the tape printing apparatus 2 print only the print image Ga, the print controller 160 transmits print data to the tape printing apparatus 2, the print data including print image data for printing the print image Ga and a print instruction command.

Figure 7:
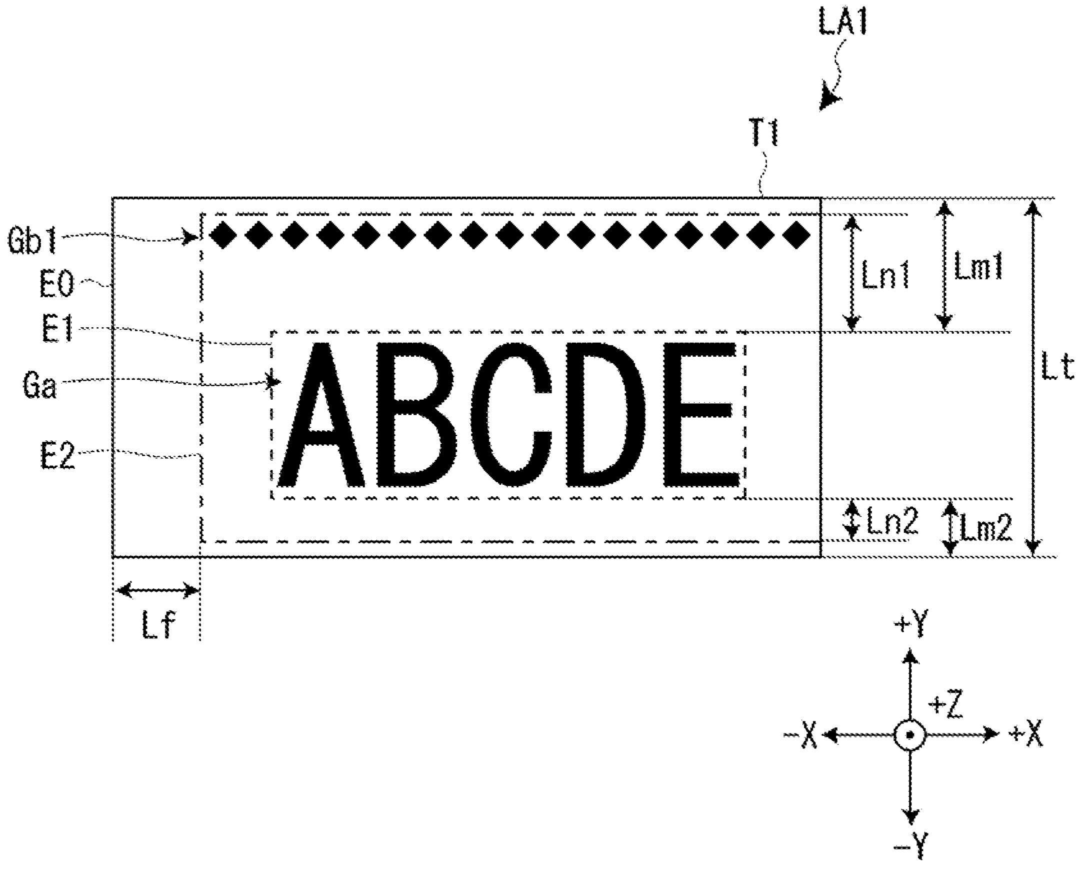
FIG. 7 is a diagram showing an example of how the regular label is printed, different from that in FIG. 5.

Next, with reference to FIGS. 5 to 7, a specific example of printing the print image Ga and the margin image Gb is described. FIG. 5 is a diagram showing an example of the regular label LA1 having the margin image Gb printed thereon. Hereinafter, the margin image Gb printed in the first margin region EM1 (see FIG. 6) is referred to as a first margin image Gb1, and the margin image Gb printed in the second margin region EM2 (see FIG. 6) is referred to as a second margin image Gb2.

When the entire region of the regular label LA1 is referred to as a label region E0, the label region E0 includes a print image data region E2 indicated by a dot-and-dash line. The print image data region E2 is a region based on print image data. The X-axis length of the print image data region E2 is determined based on the print image data, and the Y-axis length of the print image data region E2 is determined by the tape width Lt of the tape T. Thus, the mobile terminal 1 generates print image data having an X-axis length in accordance with the print image data and a Y-axis length in accordance with the tape width Lt of the tape T, and transmits print data including the generated print image data to the tape printing apparatus 2. Note that the X-axis length of the label region E0 is the sum of the X-axis length of the print image data region E2 and a front end length Lf. The front end length Lf corresponds to the length between the position printed by the printhead 25 and the position cut by the cutter 26.

The print image data region E2 includes the print region E1 indicated by a broken line. The print region E1 is a rectangular region surrounding the entire print image Ga. The disposition of the print region E1 on the print image data region E2 is determined according to results of edits made to the print image Ga, e.g., the position of the print image Ga, the text size, and the like specified by the user.

In FIG. 5, the Y-axis length of the label region E0 corresponds to the tape width Lt. Also, the length from the +Y-direction edge of the label region E0 to the +Y-direction edge of the print region E1 corresponds to the first tape margin length Lm1 described earlier, and the length from the −Y-direction edge of the label region E0 to the −Y-direction edge of the print region E1 corresponds to the second tape margin length Lm2 described earlier. In addition, a length obtained by subtraction of the length from the +Y-direction edge of the label region E0 to the +Y-direction edge of the print image data region E2 from the first tape margin length Lm1 is referred to as a first virtual margin length Ln1. Also, a length obtained by subtraction of the length from the −Y-direction edge of the label region E0 to the −Y-direction edge of the print image data region E2 from the second tape margin length Lm2 is referred to as a second virtual margin length Ln2. Note that the first virtual margin length Ln1 and the second virtual margin length Ln2 are determined by taking the specifications of the printhead 25, the length of the platen roller 28, and the like into account as well.

FIG. 6 is a diagram illustrating the margin region EM on the regular label LA1 shown in FIG. 5. The regular label LA1 shown in FIG. 5 is provided with the first margin region EM1 and the second margin region EM2 as the margin region EM, as indicated by hatching. The first margin region EM1 is a +Y-direction edge portion of the label region E0, the +Y-direction edge portion having the first tape margin length Lm1 and excluding an −X-direction end portion of the label region E0 having the front end length Lf. The second margin region EM2 is a −Y-direction edge portion of the label region E0, the −Y-direction edge portion having the second tape margin length Lm2 and excluding an −X-direction end portion of the label region E0 having the front end length Lf.

The first margin image Gb1 is printed in a first virtual margin region (not shown) which is a −Y-direction region within the first margin region EM1 and which has the first virtual margin length Ln1. More preferably, the first margin image Gb1 is printed on a +Y-direction edge portion of the first virtual margin region. The second margin image Gb2 is printed in a second virtual margin region (not shown) which is a +Y-direction region within the second margin region EM2 and which has the second virtual margin length Ln2. More preferably, the second margin image Gb2 is printed on a −Y-direction edge portion of the second virtual margin region.

The first margin image Gb1 and the second margin image Gb2 are printed in the first margin region EM1 and the second margin region EM2, respectively, from one end to the opposite end in the X-axis. Note that a pattern character used for printing the margin image Gb is prestored as part of the label creation application 30, and the mobile terminal 1 generates the margin image Gb by determining the number of repetitions of the pattern character according to the length of the first margin region EM1 and the second margin region EM2 in the X-axis, and arranges the pattern characters in the X-axis according to the number of repetitions thus determined. In the example shown in FIGS. 5 and 6, the pattern character is a black diamond mark "♦".

FIG. 7 is a diagram showing an example of the regular label LA1 having the first margin image Gb1 printed thereon and the second margin image Gb2 not printed thereon. As shown in FIG. 7, when the proportion of the second tape margin length Lm2 is small relative to the tape width Lt, i.e., when the second tape margin length Lm2 is not the first particular proportion or above of the tape width Lt, the mobile terminal 1 controls the tape printing apparatus 2 not to print the second margin image Gb2.

Figure 8:
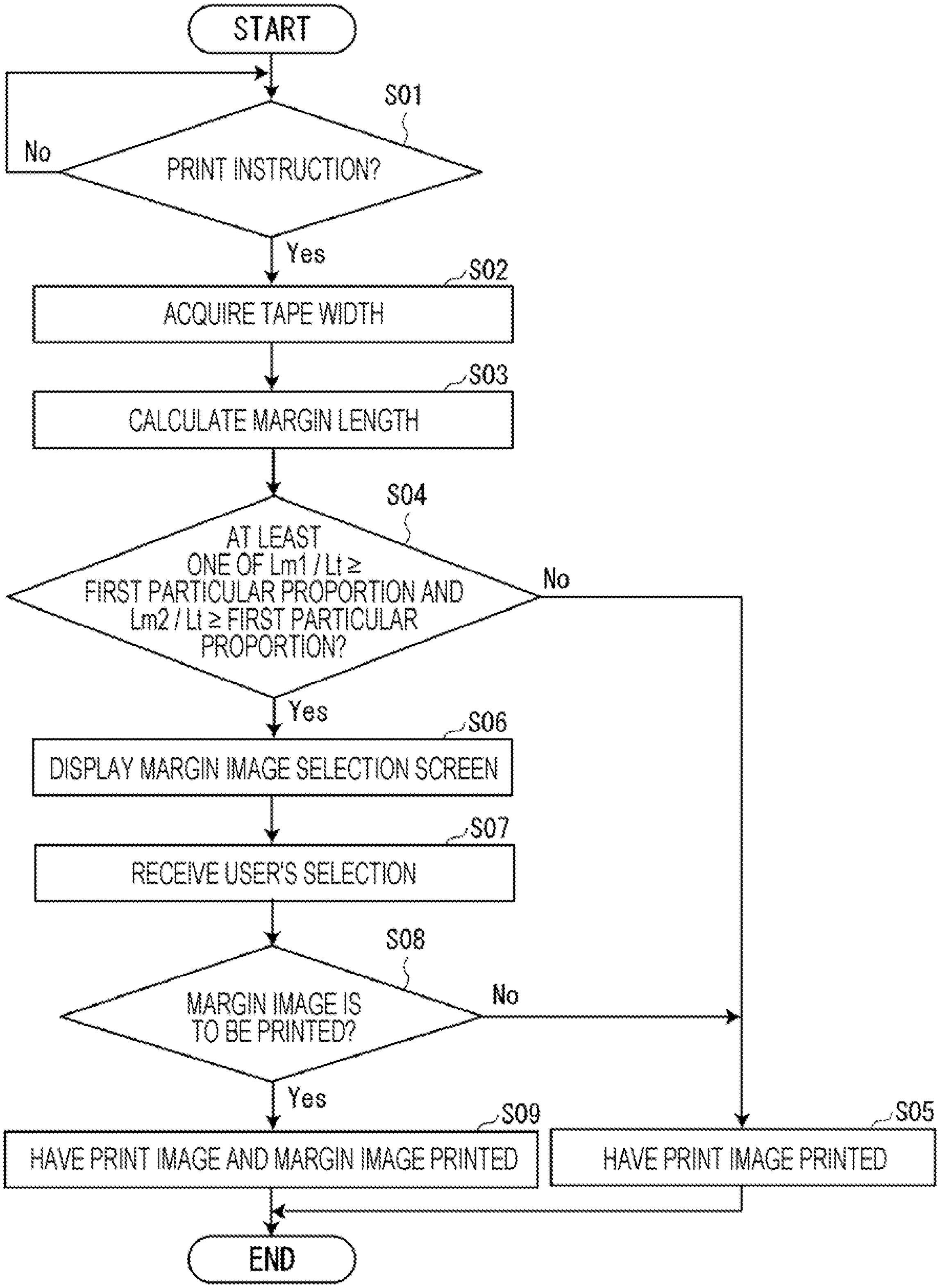
FIG. 8 is a flowchart showing how print instruction processing is performed by the mobile terminal.

With reference to the flowchart in FIG. 8, a description is given of how print instruction processing is performed by the mobile terminal 1. Note that a user has completed editing the print image Ga before the flowchart in FIG. 8 starts.

In Step S01, the mobile terminal 1 determines whether an instruction to print the print image Ga has been received. The mobile terminal 1 proceeds to Step S02 when it is determined that an instruction to print the print image Ga has been received. Meanwhile, the mobile terminal 1 repeats Step S01 when it is determined that an instruction to print the print image Ga has not been received.

In Step S02, the mobile terminal 1 acquires the tape width of the tape T housed in the tape cartridge C attached to the tape printing apparatus 2. The mobile terminal 1 transmits a cartridge information request signal to the tape printing apparatus 2 and acquires the tape width indicated by the cartridge information.

In Step S03, the mobile terminal 1 calculates the tape margin length Lm based on the print image Ga instructed to be printed in Step S01 and the tape width acquired in Step S02. As the tape margin length Lm, the mobile terminal 1 calculates the first tape margin length Lm1 and the second tape margin length Lm2.

In Step S04, the mobile terminal 1 determines whether or not the tape margin length Lm1 is the first particular proportion or above of the tape width Lt and whether or not the second tape margin length Lm2 is the first particular proportion or above of the tape width Lt. When it is determined that at least one of the first tape margin length Lm1 and the second tape margin length Lm2 is the first particular proportion or above of the tape width Lt, the mobile terminal 1 proceeds to Step S06. When it is determined that neither the first tape margin length Lm1 nor the second tape margin length Lm2 is the first particular proportion or above of the tape width Lt, the mobile terminal 1 proceeds to Step S05.

In Step S05, the mobile terminal 1 has the tape printing apparatus 2 print the print image Ga. Specifically, the mobile terminal 1 generates print data including print image data for printing the print image Ga and transmits the generated print data to the tape printing apparatus 2. After Step S05, the mobile terminal 1 ends the print instruction processing.

In Step S06, the mobile terminal 1 displays the first selection screen D1 (see FIG. 9) on the touch panel 11.

In Step S07, the mobile terminal 1 receives the user□s selection performed on the first selection screen D1.

In Step S08, the mobile terminal 1 determines whether it has been selected on the first selection screen D1 to print the margin image Gb. When it is determined that it has been selected on the first selection screen D1 to print the margin image Gb, the mobile terminal 1 proceeds to Step S09. Meanwhile, when it is determined that it has been selected on the first selection screen D1 not to print the margin image Gb, the mobile terminal 1 proceeds to Step S05.

In Step S09, the mobile terminal 1 has the tape printing apparatus 2 print the print image Ga and the margin image Gb. Specifically, the mobile terminal 1 generates print data including print image data for printing the print image Ga and the margin image Gb and transmits the generated print data to the tape printing apparatus 2. After Step S09, the mobile terminal 1 ends the print instruction processing.

FIG. 9 is a diagram showing an example of what the first selection screen D1 presents. The first selection screen D1 presents a first message 51, a YES button 52, and a NO button 53. The first message 51 is a message prompting a user to select whether to print the margin image Gb. The mobile terminal 1 determines that it has been selected to print the margin image Gb when the YES button 52 is selected on the first selection screen D1. Meanwhile, the mobile terminal 1 determines that it has been selected not to print the margin image Gb when the NO button 53 is selected on the first selection screen D1.

As thus described, when it is determined that the first tape margin length Lm1 is the first particular proportion or above of the tape width Lt and then when it is selected on the first selection screen D1 to print the margin image Gb, the mobile terminal 1 according to the first embodiment controls the tape printing apparatus 2 to print the first margin image Gb1 in the first margin region EM1. Also, when it is determined that the second tape margin length Lm2 is the first particular proportion or above of the tape width Lt and when it is selected on the first selection screen D1 to print the margin image Gb, the mobile terminal 1 controls the tape printing apparatus 2 to print the second margin image Gb2 in the second margin region EM2. Meanwhile, when it is determined that the first tape margin length Lm1 is not the first particular proportion or above of the tape width Lt, the mobile terminal 1 controls the tape printing apparatus 2 not to print the first margin image Gb1 in the first margin region EM1. Also, when it is determined that the second tape margin length Lm2 is not the first particular proportion or above of the tape width Lt, the mobile terminal 1 controls the tape printing apparatus 2 not to print the second margin image Gb2 in the second margin region EM2.

In this way, when the proportion of the tape margin length Lm is large relative to the tape width Lt, the mobile terminal 1 has the margin image Gb printed in the margin region EM, thereby allowing reduction in an area in the Y-axis where the ink on the ink ribbon R is not thermally transferred to the tape T. This can reduce the risk of creasing the ink ribbon R, and by extension, reduce print failures. Meanwhile, when the proportion of the tape margin length Lm is small relative to the tape width Lt, the mobile terminal 1 does not have the margin image Gb printed and can therefore reduce unnecessary printing.

Also, when it is determined that the first tape margin length Lm1 or the second tape margin length Lm2 is the first particular proportion or above of the tape width Lt, the mobile terminal 1 displays the first selection screen D1 on the touch panel 11 to have the user select whether to print the margin image Gb. Thus, the user can select whether to print the margin image Gb according to their purpose of using the label LA and to their preferences.

Also, when the margin image Gb is to be printed by the tape printing apparatus 2, the mobile terminal 1 has the margin image Gb printed from one end to the opposite end of the margin region EM in the X-axis. As a result, the mobile terminal 1 can minimize the risk of creasing the ink ribbon R.

Note that in the first embodiment, the following modifications can be employed.

Modification 1-1

The mobile terminal 1 may be configured without the display controller 150. In this case, the first selection screen D1 is not displayed. Specifically, the print controller 160 controls the tape printing apparatus 2 based on results of the determination made by the proportion determiner 140, not according to results of the user□s selection performed on the first selection screen D1.

Modification 1-2

The calculator 130 of the mobile terminal 1 may calculate a total margin length as the tape margin length Lm, the total margin length being a total of the first tape margin length Lm1 and the second tape margin length Lm2. In this case, the proportion determiner 140 determines whether or not the total margin length is a second particular proportion or above of the tape width Lt, the second particular proportion being different from the first particular proportion. An example of the second particular proportion is 40%. When it is determined that the total margin length is the second particular proportion or above of the tape width Lt, the print controller 160 controls the tape printing apparatus 2 to print the print image Ga in the print region E1 and to print the margin image Gb in at least one of the first margin region EM1 and the second margin region EM2. Meanwhile, when it is determined that the total margin length is not the second particular proportion or above of the tape width Lt, the print controller 160 controls the tape printing apparatus 2 to print the print image Ga in the print region E1 and not to print the margin image Gb in either of the first margin region EM1 and the second margin region EM2. This configuration allows the mobile terminal 1 to have the margin image Gb printed when the proportion of the Y-axis length of the print region E1 is small relative to the tape width Lt.

Note that when it is determined that the total margin length is the second particular proportion or above of the tape width Lt, the print controller 160 preferably controls the tape printing apparatus 2 to print the print image Ga in the print region E1 and to print the margin image Gb in at least one of the first margin region EM1 and the second margin region EM2 which is longer in the Y-axis.

Modification 1-3

Figure 10:
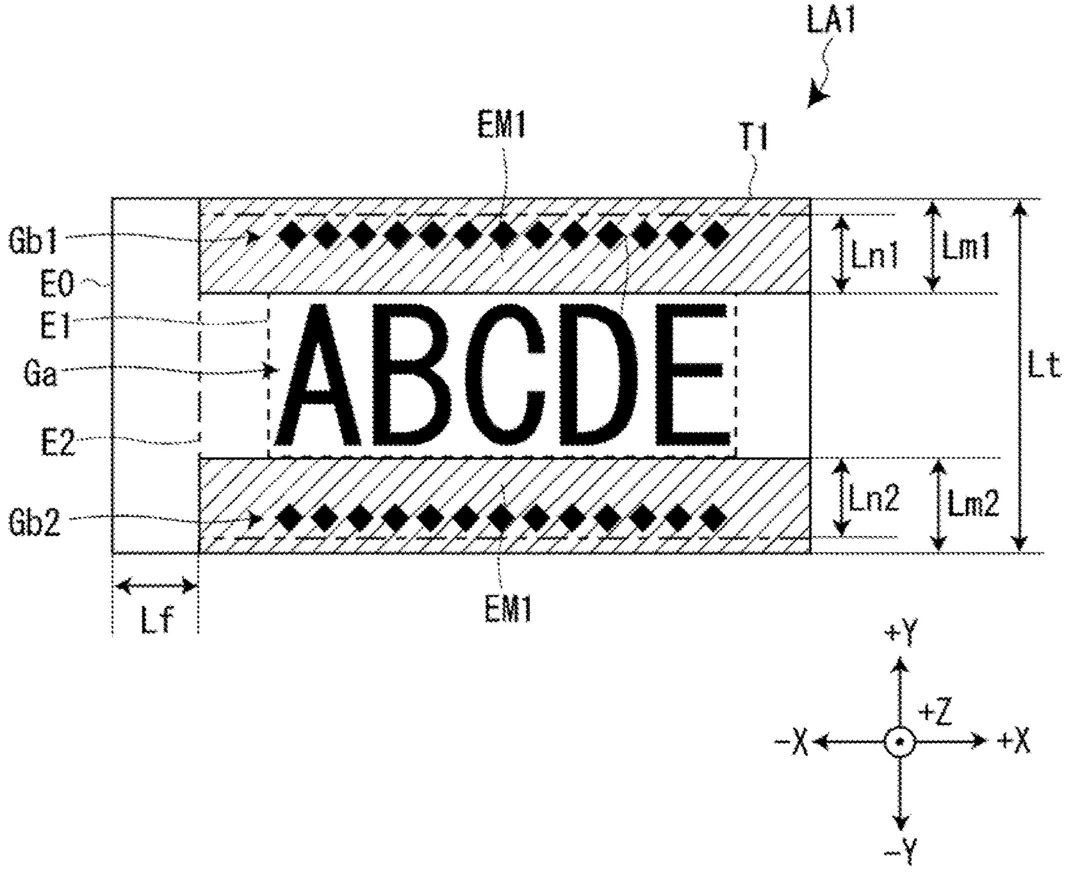
FIG. 10 is a diagram showing a print example of a regular label according to a modification.

The print controller 160 of the mobile terminal 1 may have the tape printing apparatus 2 print the margin image Gb as shown in FIG. 10. In the first margin region EM1 and the second margin region EM2 on the regular label LA1 shown in FIG. 10, the first margin image Gb1 and the second margin image Gb2 are respectively printed over an area corresponding to the area from one end to the opposite end of the print region E1 in the X-axis. In this way, the margin image Gb does not necessarily have to be printed from one end to the opposite end of each of the first margin region EM1 and the second margin region EM2 in the X-axis, and may be printed over an area in the X-axis corresponding to an area from one end to the opposite end of the print region E1 in the X-axis.

Modification 1-4

When it is selected on the first selection screen D1 to print the margin image Gb, the display controller 150 of the mobile terminal 1 may allow the user to select whether to print the margin image Gb like in the first embodiment or to print the margin image Gb like in Modification 1-3. Specifically, the display controller 150 displays a second selection screen (not shown) on the touch panel 11 to have the user select whether the margin image Gb is to be printed in the first margin region EM1 and the second margin region EM2 from one end to the opposite end in the X-axis or over an area corresponding to an area from one end to the opposite end of the print region E1 in the X-axis. In this way, the print controller 160 may determine based on a result of selection performed on the second selection screen whether to print the margin image Gb as shown in FIG. 6 or to print the margin image Gb as shown in FIG. 10.

Also, as a further modification, the mobile terminal 1 may be able to print a plurality of lines of the margin images Gb arranged in the Y-axis and have a user select the number of the lines on the second selection screen.

Modification 1-5

The display controller 150 of the mobile terminal 1 may display a third selection screen (not shown) to have a user select a pattern character for the margin image Gb. On the third selection screen, a plurality of pattern characters are presented as options. For example, the third selection screen may present pattern characters such as an underbar "_" and a circle "○" as options. Also, a pattern character may be configured of not only one image, but also a plurality of types of images, such as a black diamond and a circle "◆○". Also, the margin image Gb may be configured of not only a character, but also a continuous image such as a solid line, a broken line, a decorative pattern, or the like.

Also, as a further modification, instead of having a user select a pattern character from a plurality of options, the mobile terminal 1 may use a text string inputted by the user as a pattern character. The mobile terminal 1 may also have the user select the size of the pattern character on the third selection screen.

Modification 1-6

The proportion determiner 140 of the mobile terminal 1 may determine the proportion of the virtual margin length Ln to the tape width Lt instead of the proportion of the tape margin length Lm to the tape width Lt. The virtual margin length Ln is an example of the "margin length." Specifically, the proportion determiner 140 may determine whether or not the first virtual margin length Ln1 is the first particular proportion or above of the tape width Lt and whether or not the second virtual margin length Ln2 is the first particular proportion or above of the tape width Lt.

Modification 1-7

The functional configuration of the mobile terminal 1 shown in FIG. 4 may be implemented by the tape printing apparatus 2. In this case, the functions shown in FIG. 4 are each implemented when the printing-apparatus-side CPU 44*a* executes the control programs such as firmware stored in the printing-apparatus-side ROM 44*b*. Also, the tape printing apparatus 2 performs printing based on results of edits made to the print image Ga using the keyboard 21. The tape width acquirer 110 of the tape printing apparatus 2 acquires the tape width indicated by the cartridge information acquired from the cartridge information obtaining unit 42. Also, the display controller 150 of the tape printing apparatus 2 displays the first selection screen D1 on the display 22. Also, the print controller 160 of the tape printing apparatus 2 controls the print unit 43 to print the print image Ga and the margin image Gb.

Second Embodiment

Figure 11:
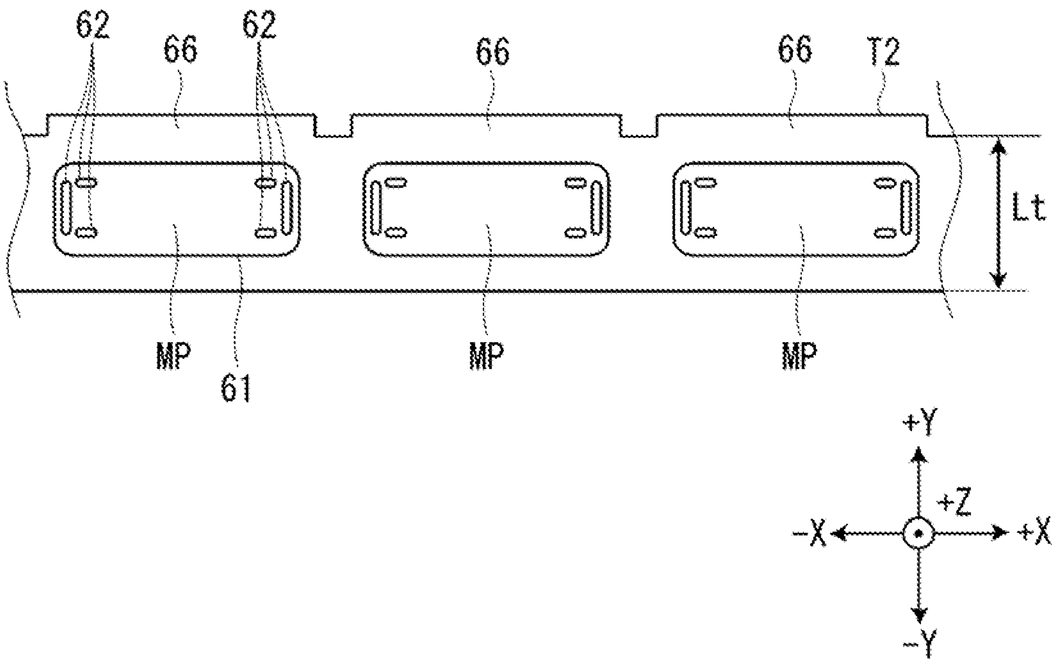
FIG. 11 is a diagram showing a plate tape in the +Z-direction.

A second embodiment of the present disclosure is described. In the first embodiment above, a case of printing the regular tape T1 shown in FIG. 3 is described. In the second embodiment, a case of printing a plate tape T2 shown in FIG. 11 is described. The following describes only the differences from the first embodiment. Note that components in the second embodiment that are the same as those in the first embodiment are denoted by the same reference numerals as those in the first embodiment to omit detailed descriptions. In addition, the modifications of the first embodiment are similarly applied to the second embodiment for the same components as those in the first embodiment.

FIG. 11 is a diagram showing the plate tape T2 in the +Z-direction. The plate tape T2 is resinous and has plate portions MP formed at equal intervals in the X-axis. The plate tape T2 is thicker than the regular tape T1, and the print surface of the plate tape T2, which is a surface on the +Z-direction, has a smaller coefficient of friction than that of the regular tape T1. When the tape T is thus thick and has a small coefficient of friction on its print surface, the ink ribbon R is likely to exhibit weak adhesion to the tape T and is difficult to follow the tape T; thus, the ink ribbon R is more likely to be creased when the plate tape T2 is used than when the regular tape T1 is used.

Perforations 61 are formed along the outer rim portion of each plate portion MP of the plate tape T2, so that the plate portion MP can be cut off at the perforations 61. The plate portion MP is used as a marker plate and is to be attached to an attachment target object, such as a cable, by inserting a zip tie or a wire through a plurality of holes 62 provided at both ends in the X-axis.

The plate tape T2 is also provided with a plurality of detection protruding portions 66 at a +Y-direction portion of the plate tape T2. The plurality of detection protruding portions 66 are formed by partial protrusion of the +Y-direction portion of the plate tape T2, and are provided at substantially equal intervals with spaces present therebetween in the X-axis. The detection protruding portions 66 are provided in the X-axis for the respective plate portions MP and are used by the tape printing apparatus 2 to detect the positions of the plate portions MP. The tape printing apparatus 2 is provided with a sensor (not shown) that detects the detection protruding portions 66 of the plate tape T2 transported along the tape transported path, and the tape printing apparatus 2 determines the timing to start printing based on detection results from the sensor. The detection protruding portions 66 extend in the +Y-direction from the +Y-direction edge of a portion of the plate tape T2 having the tape width Lt.

Figure 12:
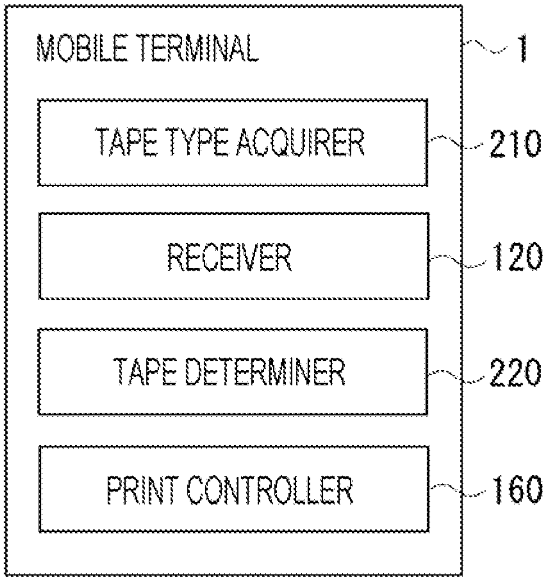
FIG. 12 is a block diagram showing the function configuration of a mobile terminal according to a second embodiment.

FIG. 12 is a block diagram showing the functional configuration of the mobile terminal 1 according to the second embodiment. The mobile terminal 1 includes, as its functional configuration, a tape type acquirer 210, the receiver 120, a tape determiner 220, and the print controller 160. These functions are all functions implemented when the mobile-terminal-side CPU 13*a* executes the label creation application 30.

The tape type acquirer 210 acquires the tape type of the tape T. The cartridge information obtained by the cartridge information obtaining unit 42 of the tape printing apparatus 2 includes information indicating the tape type of the tape T. The tape type is information such as, e.g., "regular tape T1" or "plate tape T2." The tape type acquirer 210 acquires the tape type from the cartridge information transmitted from the tape printing apparatus 2.

Based on the tape type acquired by the tape type acquirer 210, the tape determiner 220 determines whether the tape T housed in the tape cartridge C is a particular type. In the second embodiment, the tape determiner 220 determines whether the tape T housed in the tape cartridge C is the plate tape T2.

When it is determined that the tape T is the plate tape T2, the print controller 160 controls the tape printing apparatus 2 to print the print image Ga in the print region E1 and to print the margin image Gb in the margin region EM, and when it is determined that the tape T is not the plate tape T2, the print controller 160 controls the tape printing apparatus 2 to print the print image Ga in the print region E1 and not to print the margin image Gb in the margin region EM.

More specifically, when it is determined that the tape T is the plate tape T2, the print controller 160 controls the tape printing apparatus 2 to print the print image Ga in the print region E1 and to print the first margin image Gb1 and the second margin image Gb2 in the first margin region EM1 and the second margin region EM2, respectively. Meanwhile, when it is determined that the tape T is not the plate tape T2, the print controller 160 controls the tape printing apparatus 2 to print the print image Ga in the print region E1 and not to print the first margin image Gb1 and the second margin image Gb2 in the first margin region EM1 and the second margin region EM2, respectively.

Figure 13:
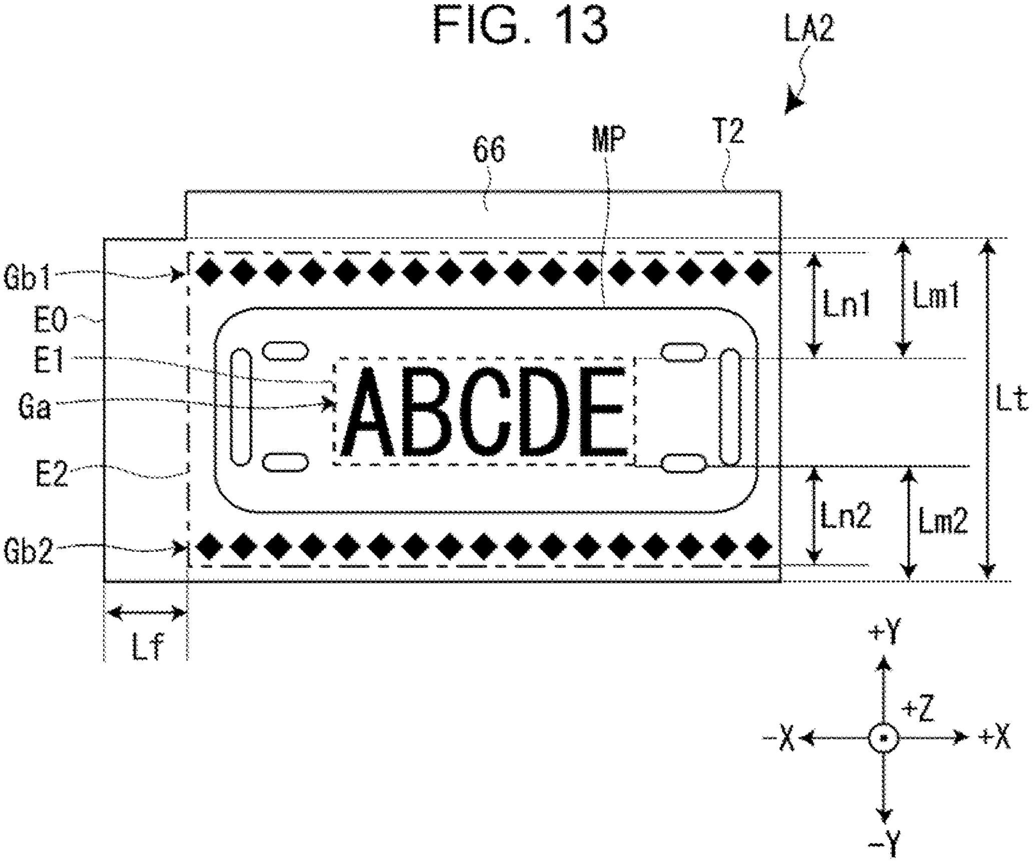
FIG. 13 is a diagram showing an example of how a plate label is printed.
Figure 14:
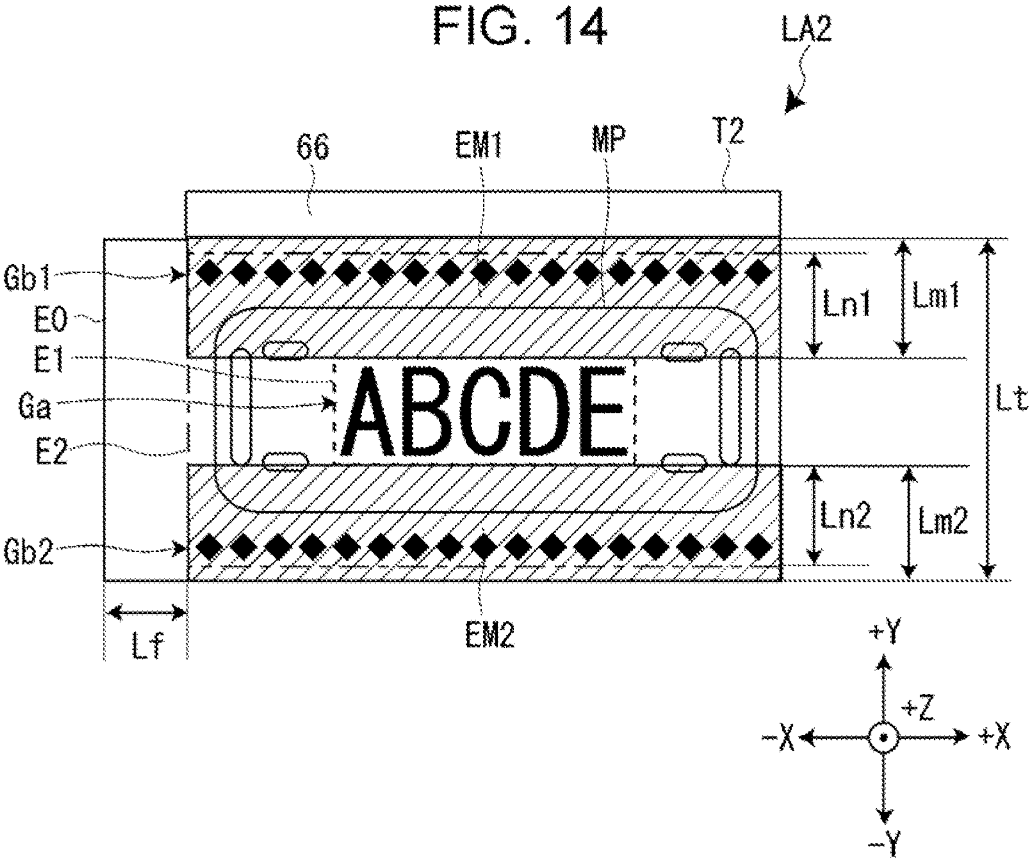
FIG. 14 is a diagram illustrating margin regions on the plate label.

With reference to FIGS. 13 and 14, a description is given of a specific example of printing the print image Ga and the margin image Gb. FIG. 13 is a diagram showing an example plate label LA2 having the margin image Gb printed thereon. The plate label LA2 is a label LA created using the plate tape T2.

The label region E0 of the plate label LA2 is a region within the entire region of the plate label LA2, the region being located on the −Y-direction of the detection protruding portion 66. In other words, the label region E0 of the plate label LA2 is a −Y-direction edge portion of the plate label LA2, the portion having the tape width Lt. The plate label LA2 includes the print image data region E2 indicated by a dot-and-dash line. The print image data region E2 is a region based on the print image data. The print image data region E2 includes the print region E1 indicated by a broken line. The print region E1 is a rectangular region surrounding the entire print image Ga. In the second embodiment, the print region E1 is a region inside the plate portion MP.

Note that not only in the first embodiment but also in the second embodiment, the length from the +Y-direction edge of the label region E0 to the +Y-direction edge of the print region E1 is the first tape margin length Lm1, and the length from the −Y-direction edge of the label region E0 to the −Y-direction edge of the print region E1 is the second tape margin length Lm2. Then, the length obtained by subtraction of the length from the +Y-direction edge of the label region E0 to the +Y-direction of the print image data region E2 from the first tape margin length Lm1 is the first virtual margin length Ln1, and the length obtained by subtraction of the length from the −Y-direction edge of the label region E0 to the −Y-direction of the print image data region E2 from the second tape margin length Lm2 is the second virtual margin length Ln2.

FIG. 14 is a diagram illustrating the margin region EM on the plate label LA2 shown in FIG. 13. The plate label LA2 is provided with, as the margin region EM, the first margin region EM1 and the second margin region EM2, as indicated by hatching. The first margin region EM1 is a region indicated by hatching and is a region within label region E0, which extends in the −Y-direction from the +Y-direction of the label region E0 and has the first tape margin length Lm1. Also, the second margin region EM2 is a region indicated by hatching and is a region within the label region E0, which extends in the +Y-direction from the −Y-direction of the label region E0 and has the second tape margin length Lm2.

The first margin image Gb1 is printed in the first virtual margin region (not shown) which is a −Y-direction region within the first margin region EM1 and having the first virtual margin length Ln1. Also, the second margin image Gb2 is printed in the second virtual margin region (not shown) which is a +Y-direction region within the second margin region EM2 and having the second virtual margin length Ln2. In the second embodiment, the first margin image Gb1 and the second margin image Gb2 are printed in regions outside the plate portion MP. Also, the first margin image Gb1 and the second margin image Gb2 are printed in the first margin region EM1 and the second margin region EM2, respectively, from one end to the opposite end in the X-axis.

Figure 15:
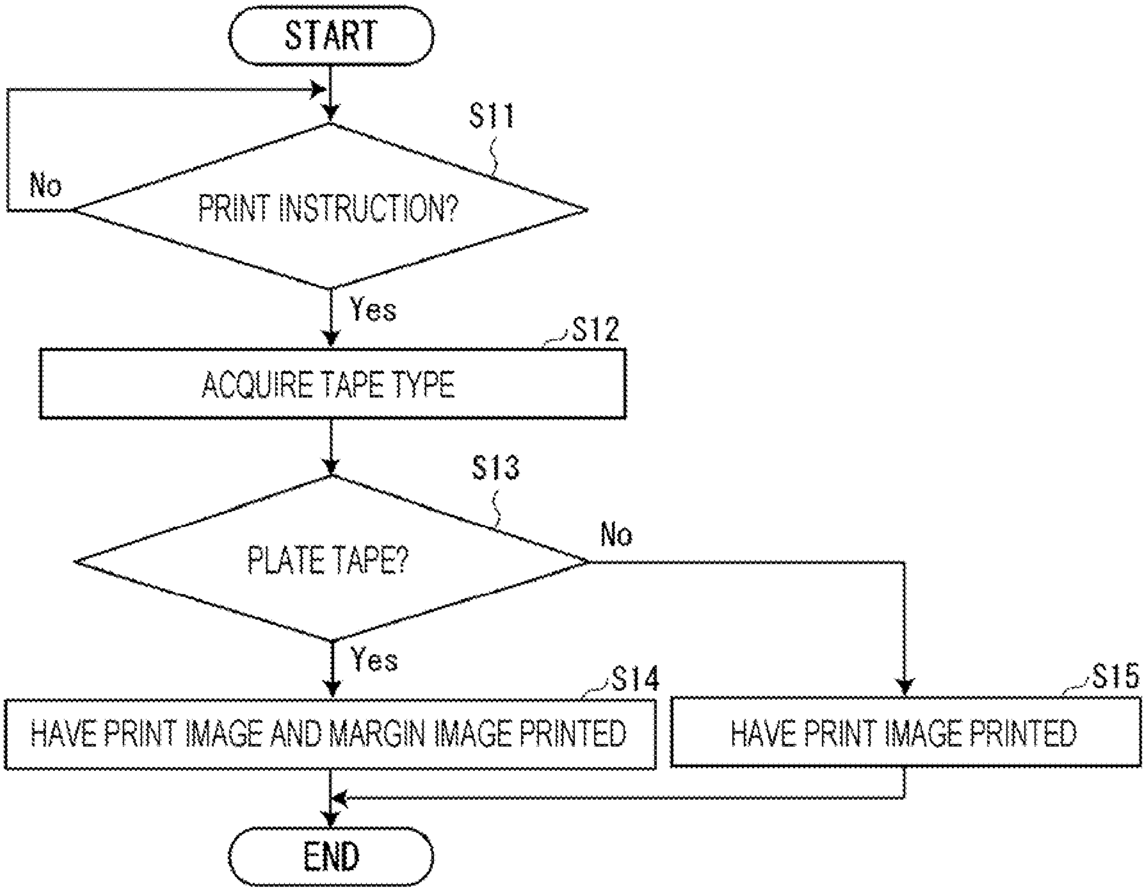
FIG. 15 is a flowchart showing how print instruction processing is performed by the mobile terminal according to the second embodiment.

With reference to the flowchart in FIG. 15, a description is given of how the print instruction processing according to the second embodiment is performed. In Step S11, the mobile terminal 1 determines whether an instruction to print the print image Ga has been received. The mobile terminal 1 proceeds to Step S12 when it is determined that an instruction to print the print image Ga has been received. Meanwhile, the mobile terminal 1 repeats Step S11 when it is determined that an instruction to print the print image Ga has not been received.

In Step S12, the mobile terminal 1 acquires the tape type of the tape T housed in the tape cartridge C attached to the tape printing apparatus 2. The mobile terminal 1 transmits a cartridge information request signal to the tape printing apparatus 2 and acquires the tape type indicated by the cartridge information.

In Step S13, based on the tape type acquired in Step S12, the mobile terminal 1 determines whether the tape T is the plate tape T2. When it is determined that the tape T is the plate tape T2, the mobile terminal 1 proceeds to Step S14. Meanwhile, when it is determined that the tape T is not the plate tape T2, the mobile terminal 1 proceeds to Step S15.

In Step S14, the mobile terminal 1 has the tape printing apparatus 2 print the print image Ga and the margin image Gb. Specifically, the mobile terminal 1 generates print data including print image data for printing the print image Ga and the margin image Gb and transmits the generated print data to the tape printing apparatus 2. After Step S14, the mobile terminal 1 ends the print instruction processing.

In Step S15, the mobile terminal 1 has the tape printing apparatus 2 print the print image Ga. Specifically, the mobile terminal 1 generates print data including print image data for printing the print image Ga and transmits the generated print data to the tape printing apparatus 2. After Step S15, the mobile terminal 1 ends the print instruction processing.

As thus described, the mobile terminal 1 according to the second embodiment controls the tape printing apparatus 2 to print the margin image Gb in the margin region EM when it is determined that the tape T used in the tape printing apparatus 2 is the plate tape T2, and controls the tape printing apparatus 2 not to print the margin image Gb in the margin region EM when it is determined that the tape T used in the tape printing apparatus 2 is not the plate tape T2. In this way, when the tape is of a type likely for the ink ribbon R to be creased, the mobile terminal 1 has the margin image Gb printed in the margin region EM, thereby effectively allowing reduction of the risk of creasing the ink ribbon R and by extension reduction of print failures. Meanwhile, when it is determined that the tape T used in the tape printing apparatus 2 is not the plate tape T2, the mobile terminal 1 does not have the margin image Gb printed, thereby allowing reduction of unnecessary printing.

Note that in the second embodiment, the following modifications can be employed.

Modification 2-1

Figure 16:
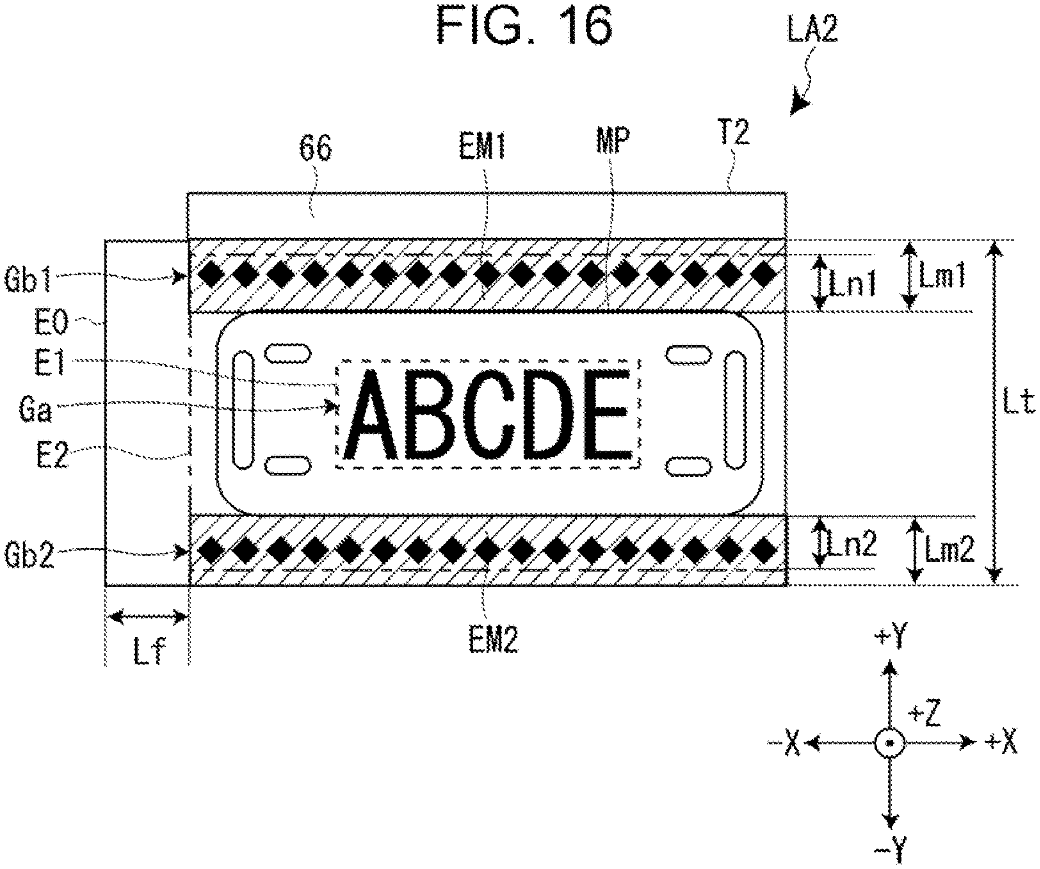
FIG. 16 is a diagram illustrating margin regions on a plate label according to a modification.

In FIG. 14, the first margin region EM1 is a region within the label region E0, which extends in the −Y-direction from the +Y-direction of the label region E0 and has the first tape margin length Lm1. Also, the second margin region EM2 is a region within the label region E0, which extends in the +Y-direction from the −Y-direction of the label region E0 and has the second tape margin length Lm2. In this modification, when the tape determiner 220 determines that the tape T housed in the tape cartridge C is the plate tape T2, the margin region EM may be set as shown in FIG. 16. Specifically, the first margin region EM1 may be a region extending from the +Y-direction of the label region E0 to the outer rim portion of the plate portion MP located on the −Y-direction. Similarly, the second margin region EM2 may be a region extending from the −Y-direction of the label region E0 to the outer rim portion of the plate portion MP located on the +Y-direction. This configuration allows the first margin image Gb1 and the second margin image Gb2 not to be printed inside the area of the plate portion MP and thus helps prevent an image unnecessary to the user from being printed inside the plate portion MP.

Modification 2-2

In the second embodiment, the print controller 160 of the mobile terminal 1 has the tape printing apparatus 2 print, as the first margin image Gb1 and the second margin image Gb2, a pattern image in which a pattern character is repeated. Alternatively, a character string like the one shown in FIG. 17 may be printed. In this case, character string information for printing the margin image Gb is prestored as part of the label creation application 30. This configuration allows information deemed useful to a user, such as a character string indicating how to cut off the plate portion MP, to be printed as the first margin image Gb1 and the second margin image Gb2.

Figure 17:
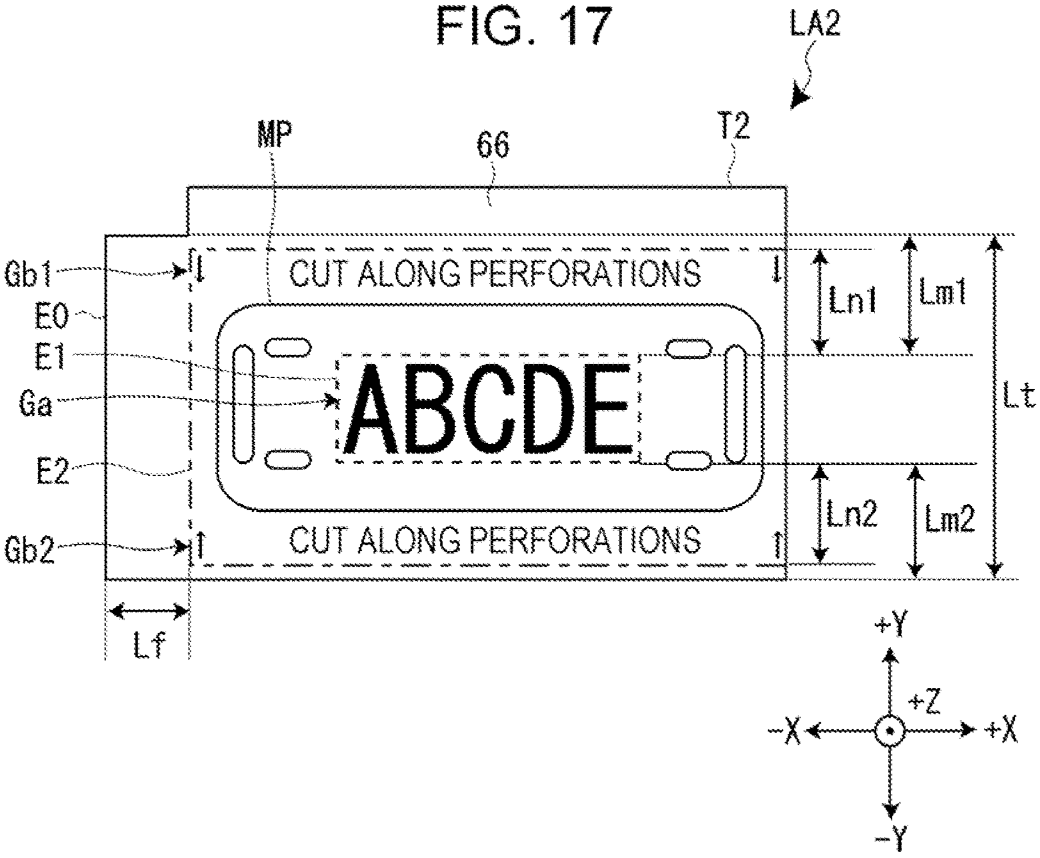
FIG. 17 is a diagram showing an example of how a plate label is printed according to a modification.

Also, in Modification 2-2, the print controller 160 may change the length of the first margin image Gb1 and the second margin image Gb2 in the X-axis by editing part of the character string so that the first margin image Gb1 and the second margin image Gb2 may be printed from one end to the opposite end, in the X-axis, of the first margin region EM1 and the second margin region EM2, respectively. For instance, in a case of printing a character string like "↓CUT ALONG PERFORATION↓" as the first margin image Gb1 as shown in FIG. 17, the print controller 160 may change the length of the first margin image Gb1 and the second margin image Gb2 by increasing or decreasing the number of the arrows at the beginning and at the end of the character string.

Modification 2-3

The print controller 160 of the mobile terminal 1 may perform the control in the second embodiment in combination with the control in the first embodiment. More specifically, when it is determined that the first tape margin length Lm1 is the first particular proportion or above of the tape width Lt of the tape T or when it is determined that the tape T is the plate tape T2, the print controller 160 may control the tape printing apparatus 2 to print the margin image Gb in the margin region EM. Also, when the first tape margin length Lm1 is not the first particular proportion or above of the tape width Lt of the tape T and when the tape T is not the plate tape T2 either, the print controller 160 may control the tape printing apparatus 2 not to print the margin image Gb in the margin region EM.

Modification 2-4

The tape determiner 220 may determine, based on the tape type acquired by the tape type acquirer 210, whether the tape T housed in the tape cartridge C is a die-cut tape. A die-cut tape is a tape in which die-cut label members are provided on a tape base sheet at substantially equal intervals in the X-axis. In this case, when it is determined that the tape T is a die-cut tape, the print controller 160 controls the tape printing apparatus 2 to print the print image Ga in the print region E1 and to print the margin image Gb in the margin region EM, and when it is determined that the tape T is not a die-cut tape, the print controller 160 controls the tape printing apparatus 2 to print the print image Ga in the print region E1 and not to print the margin image Gb in the margin region EM.

Also, as a further modification, the tape determiner 220 may determine, based on the tape type acquired by the tape type acquirer 210, whether the tape T housed in the tape cartridge C is a matrix-unremoved die-cut tape. A matrix-unremoved die-cut tape is a die-cut tape in which the surrounding portion of the label members is not peeled off from the tape base sheet. More specifically, when it is determined that the tape T is a matrix-unremoved die-cut tape, the print controller 160 controls the tape printing apparatus 2 to print the print image Ga in the print region E1 and to print the margin image Gb in the margin region EM. Also, when it is determined that the tape T is the regular tape T1 or a matrix-removed die-cut tape, the print controller 160 controls the tape printing apparatus 2 to print the print image Ga in the print region E1 and not to print the margin image Gb in the margin region EM.

Modification 2-5

The tape type acquirer 210 of the mobile terminal 1 may acquire, as the tape type, the material of the tape T, the thickness of the tape T, the coefficient of friction of the print surface of the tape T, or the like. In this case, the tape determiner 220 determines, e.g., whether the material of the tape T is a particular material, whether or not the thickness of the tape T is a thickness threshold or above, or whether or not the coefficient of friction of the print surface of the tape T is a friction coefficient threshold or below. Then, the print controller 160 has the tape printing apparatus 2 print the print image Ga and the margin image Gb when it is determined that the material of the tape T is a particular material, when it is determined that the thickness of the tape T is a thickness threshold or above, or when it is determined that the coefficient of friction of the print surface of the tape T is a friction coefficient threshold or below.

Modification 2-6

The functional configuration of the mobile terminal 1 shown in FIG. 12 may be implemented by the tape printing apparatus 2. In this case, the functions shown in FIG. 12 are each implemented when the printing-apparatus-side CPU 44*a* executes the control programs such as firmware stored in the printing-apparatus-side ROM 44*b*. Also, the tape printing apparatus 2 performs printing based on results of edits made to the print image Ga using the keyboard 21. The tape type acquirer 210 of the tape printing apparatus 2 acquires the tape type indicated by the cartridge information acquired from the cartridge information obtaining unit 42. Also, the print controller 160 of the tape printing apparatus 2 controls the print unit 43 to print the print image Ga and the margin image Gb.

The following modifications can be employed in both of the first embodiment and the second embodiment.

Modification 3-1

To have the tape printing apparatus 2 print the print image Ga and the margin image Gb, the print controller 160 of the mobile terminal 1 may send the tape printing apparatus 2 print data including print image data for printing the print image Ga, an add command for adding the margin image Gb, and a print instruction command. In this case, the tape printing apparatus 2 has a pattern character or a character string stored in a storage region such as the printing-apparatus-side ROM 44*b*. Upon receipt of print data including an add command, the tape printing apparatus 2 determines the length of the margin image Gb based on the X-axis length of the print image data region E2, which is a region based on the print image data. Then, using a pattern character or character string stored, the tape printing apparatus 2 generates the margin image Gb having the length thus determined and adds the margin image Gb to the print image data.

Modification 3-2

The mobile terminal 1 may transmit a cartridge information request signal to the tape printing apparatus 2 not only when a user gives a print instruction, but also when the label creation application 30 is activated or when an edit screen for editing the print image Ga is displayed.

Modification 3-3

The cartridge information obtaining unit 42 of the tape printing apparatus 2 may include a detector that detects the presence of a protruding portion or a recess portion formed at the tape cartridge C and obtain cartridge information based on a detection result from the detector. Alternatively, the cartridge information obtaining unit 42 of the tape printing apparatus 2 may obtain the cartridge information from a circuit board which is provided at the casing of the tape cartridge C and has a memory element.

Modification 3-4

Instead of performing printing by unreeling the tape T housed in the casing of the tape cartridge C, the tape printing apparatus 2 may perform printing by unreeling the tape T not housed in the casing of the tape cartridge C. Other modifications can also be made where appropriate without departing from the gist of the present disclosure.

ADDITIONAL REMARKS

Additional remarks are given below with respect to the information processing apparatus, the tape printing apparatus, and the method and program for controlling the information processing apparatus.

The mobile terminal 1 is the mobile terminal 1 communicatively connected to the tape printing apparatus 2 that performs printing by thermal transfer of an ink on an ink ribbon R to a tape T, the mobile terminal 1 including the tape width acquirer 110 that acquires a tape width Lt of the tape T, a receiver 120 that receives an instruction to print a print image Ga, the calculator 130 that calculates a tape margin length Lm of a margin region EM of the tape T measured in a tape width direction, the margin region EM being provided with respect to a print region E1 in the tape width direction, the print region E1 being where the print image Ga is to be printed, the proportion determiner 140 that determines whether or not the tape margin length Lm is a particular proportion or above of the tape width Lt, and the print controller 160 that controls the tape printing apparatus 2 to print the print image Ga in the print region E1 and to print a margin image Gb in the margin region EM when it is determined that the tape margin length Lm is the particular proportion or above of the tape width Lt, and controls the tape printing apparatus 2 to print the print image Ga in the print region E1 and not to print the margin image Gb in the margin region EM when it is determined that the tape margin length Lm is not the particular proportion or above of the tape width Lt.

The tape printing apparatus 2 includes the print unit 43 that performs printing by thermal transfer of an ink on an ink ribbon R to a tape T, the tape width acquirer 110 that acquires a tape width Lt of the tape T, the receiver 120 that receives an instruction to print a print image Ga, the calculator 130 that calculates a tape margin length Lm of a margin region EM of the tape T measured in a tape width direction, the margin region EM being provided with respect to a print region E1 in the tape width direction, the print region E1 being where the print image Ga is to be printed, the proportion determiner 140 that determines whether or not the tape margin length Lm is a particular proportion or above of the tape width Lt, and the print controller 160 that controls the print unit 43 to print the print image Ga in the print region E1 and to print a margin image Gb in the margin region EM when it is determined that the tape margin length Lm is the particular proportion or above of the tape width Lt, and controls the print unit 43 to print the print image Ga in the print region E1 and not to print the margin image Gb in the margin region EM when it is determined that the tape margin length Lm is not the particular proportion or above of the tape width Lt.

A method for controlling the mobile terminal 1 is a method for controlling the mobile terminal 1 communicatively connected to the tape printing apparatus 2 that performs printing by thermal transfer of an ink on an ink ribbon R to a tape T, the method including causing the mobile terminal 1 to execute acquiring a tape width Lt of the tape T, receiving an instruction to print a print image Ga, calculating a tape margin length Lm of a margin region EM of the tape T measured in a tape width direction, the margin region EM being provided with respect to a print region E1 in the tape width direction, the print region E1 being where the print image Ga is to be printed, determining whether or not the tape margin length Lm is a particular proportion or above of the tape width Lt, controlling the tape printing apparatus 2 to print the print image Ga in the print region E1 and to print a margin image Gb in the margin region EM when it is determined that the tape margin length Lm is the particular proportion or above of the tape width Lt, and controlling the tape printing apparatus 2 to print the print image Ga in the print region E1 and not to print the margin image Gb in the margin region EM when it is determined that the tape margin length Lm is not the particular proportion or above of the tape width Lt.

The label creation application 30 causes the mobile terminal 1 communicatively connected to the tape printing apparatus 2 that performs printing by thermal transfer of an ink on an ink ribbon R to a tape T to execute acquiring a tape width Lt of the tape T, receiving an instruction to print a print image Ga, calculating a tape margin length Lm of a margin region EM of the tape T measured in a tape width direction, the margin region EM being provided with respect to a print region E1 in the tape width direction, the print region E1 being where the print image Ga is to be printed, determining whether or not the tape margin length Lm is a particular proportion or above of the tape width Lt, controlling the tape printing apparatus 2 to print the print image Ga in the print region E1 and to print a margin image Gb in the margin region EM when it is determined that the tape margin length Lm is the particular proportion or above of the tape width Lt, and controlling the tape printing apparatus 2 to print the print image Ga in the print region E1 and not to print the margin image Gb in the margin region EM when it is determined that the tape margin length Lm is not the particular proportion or above of the tape width Lt.

When it is determined that the tape margin length Lm is the particular proportion or above of the tape width Lt, the mobile terminal 1 controls the tape printing apparatus 2 to print the margin image Gb in the margin region EM, and when it is determined that the tape margin length Lm is not the particular proportion or above of the tape width Lt, the mobile terminal 1 controls the tape printing apparatus 2 not to print the margin image Gb in the margin region EM. In this way, the mobile terminal 1 has the margin image Gb printed in the margin region EM when the proportion of the tape margin length Lm is large relative to the tape width Lt. The mobile terminal 1 thereby can reduce the area in the tape width direction over which there is no thermal transfer of the ink on the ink ribbon R to the tape T. This consequently can reduce the risk of creasing the ink ribbon R during the thermal transfer of the ink on the ink ribbon R to the tape T, and by extension, reduce print failures. Meanwhile, the mobile terminal 1 does not have the margin image Gb printed when the proportion of the tape margin length Lm is small relative to the tape width Lt. Thus, unnecessary printing can be reduced.

In the above mobile terminal 1, the tape T may be provided with, as the margin region EM, the first margin region EM1 located on one side of the print region E1 in the tape width direction and the second margin region EM2 located on an opposite side of the print region E1 in the tape width direction, the calculator 130 may calculate, as the tape margin length Lm, the first tape margin length Lm1 of the first margin region EM1 measured in the tape width direction and the second tape margin length Lm2 of the second margin region EM2 measured in the tape width direction, the proportion determiner 140 may determine, using a first particular proportion as the particular proportion, whether or not the first tape margin length Lm1 is the first particular proportion or above of the tape width Lt and determine whether or not the second tape margin length Lm2 is the first particular proportion or above of the tape width Lt, the print controller 160 may control the tape printing apparatus 2 to print the print image Ga in the print region E1 and to print the margin image Gb in the first margin region EM1 when it is determined that the first tape margin length Lm1 is the first particular proportion or above of the tape width Lt, and the print controller 160 may control the tape printing apparatus 2 to print the print image Ga in the print region E1 and to print the margin image Gb in the second margin region EM2 when it is determined that the second tape margin length Lm2 is the first particular proportion or above of the tape width Lt.

The mobile terminal 1 has the margin image Gb printed in the first margin region EM1 when it is determined that the first tape margin length Lm1 is the first particular proportion or above of the tape width Lt and has the margin image Gb printed in the second margin region EM2 when it is determined that the second tape margin length Lm2 is the first particular proportion or above of the tape width Lt. In this way, the mobile terminal 1 determines for each of the two margin regions EM provided in the tape width direction whether the tape margin length Lm is the first particular proportion or above of the tape width Lt. The mobile terminal 1 thus can further reduce the area in the tape width direction over which there is no thermal transfer of the ink on the ink ribbon R to the tape T. The mobile terminal 1 can thereby reduce the risk of creasing the ink ribbon R more effectively.

In the above mobile terminal 1, the tape T may be provided with, as the margin region EM, the first margin region EM1 located on one side of the print region E1 in the tape width direction and the second margin region EM2 located on an opposite side of the print region E1 in the tape width direction, the calculator 130 may calculate, as the tape margin length Lm, a total margin length which is a total of the first tape margin length Lm1 of the first margin region EM1 measured in the tape width direction and the second tape margin length Lm2 of the second margin region EM2 measured in the tape width direction, the proportion determiner 140 may determine, using a second particular proportion as the particular proportion, whether or not the total margin length is the second particular proportion or above of the tape width Lt, the print controller 160 may control the tape printing apparatus 2 to print the print image Ga in the print region E1 and to print the margin image Gb in at least one of the first margin region EM1 and the second margin region EM2 when it is determined that the total margin length is the second particular proportion or above of the tape width Lt.

The mobile terminal 1 determines whether the total margin length, which is the total of the first tape margin length Lm1 and the second tape margin length Lm2, is the second particular proportion or above of the tape width Lt, and has the margin image Gb printed in at least one of the first margin region EM1 and the second margin region EM2 when it is determined that the total margin length is the second particular proportion or above of the tape width Lt. The mobile terminal 1 can thus have the margin image Gb printed when the proportion of the length of the print region E1 measured in the tape width direction is small relative to the tape width Lt.

The above mobile terminal 1 may further include the display controller 150 that displays the first selection screen D1 on the touch panel 11 to have a user select whether to print the margin image Gb when it is determined that the tape margin length Lm is the particular proportion or above of the tape width Lt. When it is selected on the first selection screen D1 to print the margin image Gb, the print controller 160 may control the tape printing apparatus 2 to print the print image Ga in the print region E1 and to print the margin image Gb in the margin region EM, and when it is selected on the first selection screen D1 not to print the margin image Gb, the print controller 160 may control the tape printing apparatus 2 to print the print image Ga in the print region E1 and not to print the margin image Gb in the margin region EM.

When it is determined that the tape margin length Lm is the particular proportion or above of the tape width Lt, the mobile terminal 1 displays the first selection screen D1 to have the user select whether to print the margin image Gb. Thus, the user can select whether to print the margin image Gb according to their purpose of using the label LA and to their preferences.

In the above mobile terminal 1, when it is determined that the tape margin length Lm is the particular proportion or above of the tape width Lt, the print controller 160 may control the tape printing apparatus 2 to print the print image Ga in the print region E1 and to print the margin image Gb from one end to an opposite end of the margin region EM in a tape length direction.

The mobile terminal 1 has the margin image Gb printed from one end to the opposite end of the margin region EM in the tape length direction. The mobile terminal 1 can thus minimize creasing of the ink ribbon R during thermal transfer of the ink on the ink ribbon R to the tape T.

The mobile terminal 1 is the mobile terminal 1 communicatively connected to the tape printing apparatus 2 that performs printing by thermal transfer of an ink on an ink ribbon R to a tape T, the mobile terminal 1 including: the tape type acquirer 210 that acquires a tape type of the tape T, the receiver 120 that receives an instruction to print a print image Ga, the tape determiner 220 that determines whether the tape T is of a particular type based on the tape type acquired, and the print controller 160 that controls the tape printing apparatus 2 to print the print image Ga in a print region E1 of the tape T and to print a margin image Gb in a margin region EM of the tape T provided with respect to the print region E1 in the tape width direction when it is determined that the tape T is of the particular type and controls the tape printing apparatus 2 to print the print image Ga in the print region E1 and not to print the margin image Gb in the margin region EM when it is determined that the tape T is not of the particular type.

The mobile terminal 1 controls the tape printing apparatus 2 to print the margin image Gb in the margin region EM when it is determined that the tape type of the tape T used in the tape printing apparatus 2 is a particular type, and controls the tape printing apparatus 2 not to print the margin image Gb in the margin region EM when it is determined that the tape type of the tape T used in the tape printing apparatus 2 is not a particular type. In this way, when the tape type is one that is likely to crease the ink ribbon R, the mobile terminal 1 has the margin image Gb printed in the margin region EM, thereby allowing effective reduction of the risk of creasing the ink ribbon R and by extension reduction of print failures. Meanwhile, the mobile terminal 1 does not have the margin image Gb printed when it is determined that the tape type used in the tape printing apparatus 2 is not a particular type, and therefore can reduce unnecessary printing.

What is claimed is:

1. An information processing apparatus communicatively connected to a tape printing apparatus that performs printing by thermal transfer of an ink on an ink ribbon to a tape, the information processing apparatus comprising:
- a tape width acquirer that acquires a tape width of the tape;
- a receiver that receives an instruction to print a print image;
- a calculator that calculates a margin length of a margin region of the tape measured in a tape width direction, the margin region being provided with respect to a print region in the tape width direction, the print region being where the print image is to be printed;
- a proportion determiner that determines whether or not the margin length is a particular proportion or above of the tape width; and
- a print controller that controls the tape printing apparatus to print the print image in the print region and to print a margin image in the margin region when it is determined that the margin length is the particular proportion or above of the tape width, and controls the tape printing apparatus to print the print image in the print region and not to print the margin image in the margin region when it is determined that the margin length is not the particular proportion or above of the tape width.

2. The information processing apparatus according to claim 1, wherein
- the tape is provided with, as the margin region, a first margin region located on one side of the print region in the tape width direction and a second margin region located on an opposite side of the print region in the tape width direction,
- the calculator calculates, as the margin length, a first margin length of the first margin region measured in the tape width direction and a second margin length of the second margin region measured in the tape width direction,
- the proportion determiner determines, using a first particular proportion as the particular proportion, whether or not the first margin length is the first particular proportion or above of the tape width and determines whether or not the second margin length is the first particular proportion or above of the tape width,
- the print controller controls the tape printing apparatus to print the print image in the print region and to print the margin image in the first margin region when it is determined that the first margin length is the first particular proportion or above of the tape width, and
- the print controller controls the tape printing apparatus to print the print image in the print region and to print the margin image in the second margin region when it is determined that the second margin length is the first particular proportion or above of the tape width.

3. The information processing apparatus according to claim 1, wherein
- the tape is provided with, as the margin region, a first margin region located on one side of the print region in the tape width direction and a second margin region located on an opposite side of the print region in the tape width direction,
- the calculator calculates, as the margin length, a total margin length which is a total of a first margin length of the first margin region measured in the tape width direction and a second margin length of the second margin region measured in the tape width direction,
- the proportion determiner determines, using a second particular proportion as the particular proportion, whether or not the total margin length is the second particular proportion or above of the tape width, and
- when it is determined that the total margin length is the second particular proportion or above of the tape width, the print controller controls the tape printing apparatus to print the print image in the print region and to print the margin image in at least one of the first margin region and the second margin region.

4. The information processing apparatus according to claim 1, further comprising a display controller that displays a selection screen on a display unit to have a user select whether to print the margin image when it is determined that the margin length is the particular proportion or above of the tape width, wherein
- when it is selected on the selection screen to print the margin image, the print controller controls the tape printing apparatus to print the print image in the print region and to print the margin image in the margin region, and
- when it is selected on the selection screen not to print the margin image, the print controller controls the tape printing apparatus to print the print image in the print region and not to print the margin image in the margin region.

5. The information processing apparatus according to claim 1, wherein
- when it is determined that the margin length is the particular proportion or above of the tape width, the print controller controls the tape printing apparatus to print the print image in the print region and to print the margin image from one end to an opposite end of the margin region in a tape length direction.

6. An information processing apparatus communicatively connected to a tape printing apparatus that performs printing by thermal transfer of an ink on an ink ribbon to a tape, the information processing apparatus comprising:
- a tape type acquirer that acquires a tape type of the tape;
- a receiver that receives an instruction to print a print image;
- a tape determiner that determines whether the tape is of a particular type based on the tape type acquired; and
- a print controller that controls the tape printing apparatus to print the print image in a print region of the tape and to print a margin image in a margin region of the tape provided with respect to the print region in the tape width direction when it is determined that the tape is of the particular type, and controls the tape printing apparatus to print the print image in the print region and not to print the margin image in the margin region when it is determined that the tape is not of the particular type.

7. A tape printing apparatus comprising:
- a print unit that performs printing by thermal transfer of an ink on an ink ribbon to a tape;
- a tape width acquirer that acquires a tape width of the tape;
- a receiver that receives an instruction to print a print image;
- a calculator that calculates a margin length of a margin region of the tape measured in a tape width direction, the margin region being provided with respect to a print region in the tape width direction, the print region being where the print image is to be printed;
- a proportion determiner that determines whether or not the margin length is a particular proportion or above of the tape width; and a print controller that controls the print unit to print the print image in the print region and to print a margin image in the margin region when it is determined that the margin length is the particular proportion or above of the tape width, and controls the print unit to print the print image in the print region and not to print the margin image in the margin region when it is determined that the margin length is not the particular proportion or above of the tape width.

8. A method for controlling an information processing apparatus communicatively connected to a tape printing apparatus that performs printing by thermal transfer of an ink on an ink ribbon to a tape, the method comprising causing the information processing apparatus to execute acquiring a tape width of the tape, receiving an instruction to print a print image, calculating a margin length of a margin region of the tape measured in a tape width direction, the margin region being provided with respect to a print region in the tape width direction, the print region being where the print image is to be printed, determining whether or not the margin length is a particular proportion or above of the tape width, controlling the tape printing apparatus to print the print image in the print region and to print a margin image in the margin region when it is determined that the margin length is the particular proportion or above of the tape width, and controlling the tape printing apparatus to print the print image in the print region and not to print the margin image in the margin region when it is determined that the margin length is not the particular proportion or above of the tape width.

9. A non-transitory computer-readable storage medium storing a program, the program comprising:

causing an information processing apparatus communicatively connected to a tape printing apparatus that performs printing by thermal transfer of an ink on an ink ribbon to a tape to execute acquiring a tape width of the tape, receiving an instruction to print a print image, calculating a margin length of a margin region of the tape measured in a tape width direction, the margin region being provided with respect to a print region in the tape width direction, the print region being where the print image is to be printed, determining whether or not the margin length is a particular proportion or above of the tape width, controlling the tape printing apparatus to print the print image in the print region and to print a margin image in the margin region when it is determined that the margin length is the particular proportion or above of the tape width, and controlling the tape printing apparatus to print the print image in the print region and not to print the margin image in the margin region when it is determined that the margin length is not the particular proportion or above of the tape width.

* * * * *